United States Patent [19]
Bissonnette et al.

[11] Patent Number: 5,602,963
[45] Date of Patent: Feb. 11, 1997

[54] VOICE ACTIVATED PERSONAL ORGANIZER

[75] Inventors: W. Michael Bissonnette, North Hills; Douglas L. Turner, Thousand Oaks; Mark P. Fortunato, Reseda, all of Calif.

[73] Assignee: Voice Powered Technology International, Inc., Canoga Park, Calif.

[21] Appl. No.: 134,327

[22] Filed: Oct. 12, 1993

[51] Int. Cl.$^6$ ........................................... G10L 5/00
[52] U.S. Cl. ........................................ 395/2.84; 395/2.83
[58] Field of Search ............................ 395/2.79, 2.83, 395/2.84, 2.53, 600; 381/41–43; 364/709.11, 709.12

[56] References Cited

U.S. PATENT DOCUMENTS

| | | | |
|---|---|---|---|
| 4,117,542 | 9/1978 | Klausner et al. | 364/705.05 |
| 4,228,470 | 10/1980 | Rahamin et al. | 360/12 |
| 4,302,752 | 11/1981 | Weitzler | 340/309.15 |
| 4,391,530 | 7/1983 | Wakabayashi et al. | 368/63 |
| 4,573,187 | 2/1986 | Bui et al. | 395/2.84 |
| 4,644,107 | 2/1987 | Clowes et al. | 379/354 |
| 4,829,577 | 5/1989 | Kuroda et al. | 395/2.53 |
| 4,864,622 | 9/1989 | Iida et al. | 395/2.55 |
| 4,882,685 | 11/1989 | van der Lely | 364/709.11 |
| 4,928,302 | 5/1990 | Kaneuchi et al. | 379/88 |
| 5,007,081 | 4/1991 | Schmuckal et al. | 379/354 |
| 5,014,317 | 5/1991 | Kita et al. | 395/2.83 |
| 5,020,107 | 5/1991 | Rohani et al. | 395/2.84 |
| 5,237,651 | 8/1993 | Randall | 395/148 |
| 5,335,276 | 8/1994 | Thompson et al. | 395/2.84 |

OTHER PUBLICATIONS

Lu, "A Small Revelation", Macworld, Sep. 1993, pp. 102–106.

*Primary Examiner*—David D. Knepper
*Attorney, Agent, or Firm*—Loeb & Loeb LLP

[57] ABSTRACT

A small, portable, hand-held electronic personal organizer performs voice recognition on words spoken by a user to input data into the organizer and records voice messages from the user. The spoken words and the voice messages are input via a microphone. The voice messages are compressed before being converted into digital signals for storage. The stored digital voice messages are reconverted into analog signals and then expanded for reproduction using a speaker. The organizer is capable of a number of a different functions, including voice training, memo record, reminder, manual reminder, timer setting, message review, waiting message, calendar, phone group select, number retrieval, add phone number, security, and "no" logic. During such various functions, data is principally entered by voice and occasionally through use of a limited keypad, and voice recordings are made and played back as appropriate. A visual display provides feedback to the user. During the various function, the user can edit various different data within the organizer by eliminating or correcting such data or entering new data.

6 Claims, 19 Drawing Sheets

VOICE ACTIVATED PERSONAL ORGANIZER

BACKGROUND OF THE INVENTION

1. Field of the Invention

The present invention relates to personal organizers for electronically storing messages, reminders, phone numbers, addresses, and other such data, and more particularly to personal organizers which are voice activated.

2. History of the Prior Art

Many types of electronic personal organizers or "data banks" are presently available. Such organizers range from simple devices that allow for storage of phone numbers, addresses and appointments, to more complicated devices that approach the capabilities of small computers. All such devices require data to be entered using a keyboard. Simpler devices may use a calculator type keyboard, while more complex devices typically require a computer/typewriter type of keyboard.

In presently available electronic personal organizers, the user typically selects a function by pressing one or more keys on the keyboard. The user then enters data using the keyboard, usually filling out a predefined form for the function selected. For example, a phone directory entry typically requires the user to type the name of the person or organization to be added to the directory, in a specific field. The user then indicates by keystroke when the filling of the field is finished. The organizer then automatically moves to the next field, where the user inputs the phone number. This field may be further subdivided into area code and phone number. When entry of the information is finished, the user indicates by keypress that the entry is to be saved.

Retrieval of data is accomplished by similar keypress operations, in conventional electronic personal organizers. The user again begins by selecting the function, following which a search for the desired information is begun. In the case of the phone directory previously referred to, the user may simply scroll through the directory looking for the desired entry, with a single keypress being used to advance from one entry to the next. A more sophisticated search is often provided, by which the user may type the first letter (or perhaps more) of the name. This causes the directory to skip to the appropriate alphabetical region.

In conventional electronic personal organizers, a second type of data is often stored. Instead of being stored for later retrieval at the user's initiation, this data is interpreted by the organizer so as to ultimately cause the organizer to take a particular action at a later time, with no further action on the part of the user being required. For example, a time and date can be entered in a reminder function. The organizer keeps track of the time in order to automatically alert the user when the selected time arrives, with no user intervention being required. Thus, an alarm function is performed. Typically, a message is associated with the alarm function to provide the reminder with some context. The message as well as the alarm time are entered by keystrokes in a form similar to that described previously in connection with the phone directory example.

When using conventional electronic personal organizers in the manner described, the user must type in information using a small keypad. The keypad must be of minimum size in order for the keys to be usable. This conflicts with the need to make the organizer as small and portable as possible. Elimination of the need for a complete keypad for data input and retrieval would eliminate the need for compromise, allowing the organizer to be made small and portable and at the same time easily used. As previously noted, conventional electronic personal organizers typically require a computer/typewriter type keyboard for complete flexibility in entry of number data, such as phone numbers, times and dates, and text data, such as memos. This requires a certain level of skill on the user's part, and can be quite time consuming. Also, the large number of keys required results in the unit being relatively large.

For this reason, voice activation and other voice recognition techniques have provided a useful alternative to the need for elaborate user interfacing through use of a large keyboard, in certain electronic devices. Examples of voice activated electronic devices include remote controls which utilize sophisticated electronics to recognize spoken words, translate the commands of the user into traditional digital remote control signals, and transmit the control signals to a controlled device. Examples of such systems are provided by co-pending application Ser. No. 07/915,112 of Bissonnette et al., entitled Voice Operated Remote Control Device, by co-pending application Ser. No. 07/915,938 of Bissonnette et al., entitled Voice Recognition Apparatus and method, and by co-pending application Ser. No. 07/915,114 of Fischer, entitled Remote Control Device. All three applications were filed on Jul. 17, 1992 and are commonly assigned with the present application.

A further example of a voice operated remote control system is provided by co-pending application Ser. No. 08/113,394 of Fischer et al., entitled Voice Operated Remote Control System. The Fischer et al. application, which was filed Aug. 27, 1993 and which is commonly assigned with the present application, describes a system which includes a remote control device responsive to the voice commands of the user to transmit representations of the voice commands to a controlled device. The controlled device produces voice signals in response to the transmitted representations, and includes voice recognition circuitry for recognizing the transmitted voice commands and executing action routines denoted thereby.

Voice recognition techniques have also been applied to systems capable of performing organizer type functions. Typically, such systems are very large in size in order to accommodate the data storage and other functions. This severely limits their applicability to small, portable, handheld applications. An example of such systems is provided by U.S. Pat. No. 5,014,317 of Kita et al., which describes recording and reproducing apparatus in which externally input voice commands stating an alarm time are converted into voice data for storage in a memory together with an associated message. When the alarm time is reached, the corresponding voice data stored in the memory is read out and audibly reproduced so as to sound the alarm time and play back the associated message.

The system described in Kita et al. is exemplary of extremely complex systems which are difficult and expensive to implement, and yet which are limited in terms of their flexibility in changing or correcting data and in terms of the functions which they otherwise can perform. Such systems typically carry out voice recognition and voice recording simultaneously, thereby requiring a substantial amount of hardware.

In addition to the large, elaborate, computer type systems such as that described in Kita et al., voice recognition techniques have been applied to smaller systems where the functions may be simpler and easier to perform in compact environments. An example of this is provided by U.S. Pat. No. 4,882,685 of van der Lely, which patent describes a calculator responsive to certain action words such as "add", "subtract", "multiply", and "divide". Other examples of such systems are provided by patents relating to automatic telephone dialers. Such patents include U.S. Pat. No. 4,644,107 of Clowes et al., U.S. Pat. No. 5,007,081 of Schmuckal et al., U.S. Pat. No. 4,928,302 of Kaneuchi et al., and U.S. Pat. No. 4,864,622 of Iida et al.

In developing electronic personal organizers, it has become apparent that digital voice recording is a significantly easier and more natural method than text to input and store data. Furthermore, input data in the form of numbers, dates, times, and the like, can be handled in a more natural and simpler way by utilizing voice recognition technology. However, while such techniques greatly simplify use of the organizer, they do so at the expense of considerably greater complexity in the implementation of the organizer. This is a particular problem if the organizer is to be produced in a small, portable form. Thus, whereas a text memo typed into a conventional organizer using a keyboard will typically require 7 or 8 bits for each character, and a simple message such as "Call the office and speak with Bob" will typically require 238–272 bits, plus several additional "overhead" bits to keep the stored information organized, an organizer utilizing digital voice recording and voice recognition of data input will typically require 16,000–32,000 bits for proper storage of a sentence requiring only 1–2 seconds to speak. In addition to such storage requirements, there is the added requirement of providing the electronics for voice input and playback, including a microphone, a speaker, and appropriate amplifiers.

In such organizers utilizing voice recognition, there is the increased requirement of additional componentry for implementing the voice recognition process. There is also the need for sufficient processing power to enable a voice recognition algorithm to be run, and increased memory requirements both for the program memory, typically a ROM, for storage of the recognition algorithm and other parts of the organizer program, as well as a read-write type memory, typically a RAM, for storage of information pertaining to the voice of the user. At that, such added memory requirements are but a small fraction of the memory requirements for voice recording.

To make the implementation practical, the voice recognition requirements must be limited. The method of use should provide context for the recognition function, to allow for voice recognition with the limited processing power obtainable in a small, portable device. For example, requiring recognition during a continuous stream of speech on a few key words placed at varying points within the utterance would require a large, complex computer system.

Accordingly, there is a need for an electronic personal organizer capable of digitally storing reasonable amounts of message data, and facilitating the use thereof through appropriate voice recognition techniques. At the same time, such an organizer must be capable of implementation in a small, portable, hand-held package in order for it to be practical and to lend itself to large-scale use.

BRIEF SUMMARY OF THE INVENTION

Briefly stated, the present invention provides an electronic personal organizer which provides for data entry and retrieval using voice for commands as well as data input. Two types of voice interaction are provided; digital voice recording and voice recognition. A minimal number of buttons or other manual controls are required, enabling a less complicated device with ease of user interface.

In electronic organizers according to the invention, voice recognition is performed on words spoken by the user to input data into the organizer. At the same time, voice messages from the user are recorded in the organizer. The organizer follows a set routine so that it can readily be determined when voice input from the user comprises input data for the voice recognition process and when the voice input is a message to be stored. The voice messages are preferably compressed and then converted into digital signals for storage in a memory. The spoken words and the voice messages may be input using a microphone.

In electronic organizers according to the invention, voice recognition is carried out by implementing a voice recognition algorithm in conjunction with templates previously made from a user's voice and stored. When setting up the organizer for use, the user is required to speak each of a limited vocabulary of key words into the organizer, for creation and storage of the digital templates corresponding to the user's spoken words. Thereafter, as the user speaks the various words, the spoken words are compared with the stored templates in search of matches which denote recognition of certain ones of the key words. The various templates are trained until acceptable matches with the user's voice can be confirmed. Thereafter, the templates can be periodically corrected or retrained as appropriate.

The voice messages stored in the electronic organizer are selectively played back by converting such messages into analog signals and amplifying and filtering such signals before application to a speaker to produce the audio sounds corresponding thereto.

The electronic organizer includes a liquid crystal display or similar display together with a limited keypad. The keypad provides for manual entry of a limited number of selections and commands in connection with the voice recognition process. The display provides information feedback to the user, to facilitate interaction between the user and the organizer.

The electronic organizer includes a microcontroller having a plurality of different memories for storage of information together with a microprocessor and a stored program. The program establishes a set operating routine for the organizer, whereby various different predetermined functions may be carried out. By having a set operating routine, the organizer can determine which voice inputs require voice recognition in accordance with the limited vocabulary of key words and which voice inputs comprise voice messages to be stored.

Various functions which the electronic organizer is capable of performing include memo record, reminder, manual reminder, timer setting, message review, phone group select, number retrieval, add phone number, security, and "no" logic.

BRIEF DESCRIPTION OF THE DRAWINGS

A better understanding of the invention may be had by reference to the following specification in conjunction with the accompanying drawings, in which.

DETAILED DESCRIPTION

Figure 1:
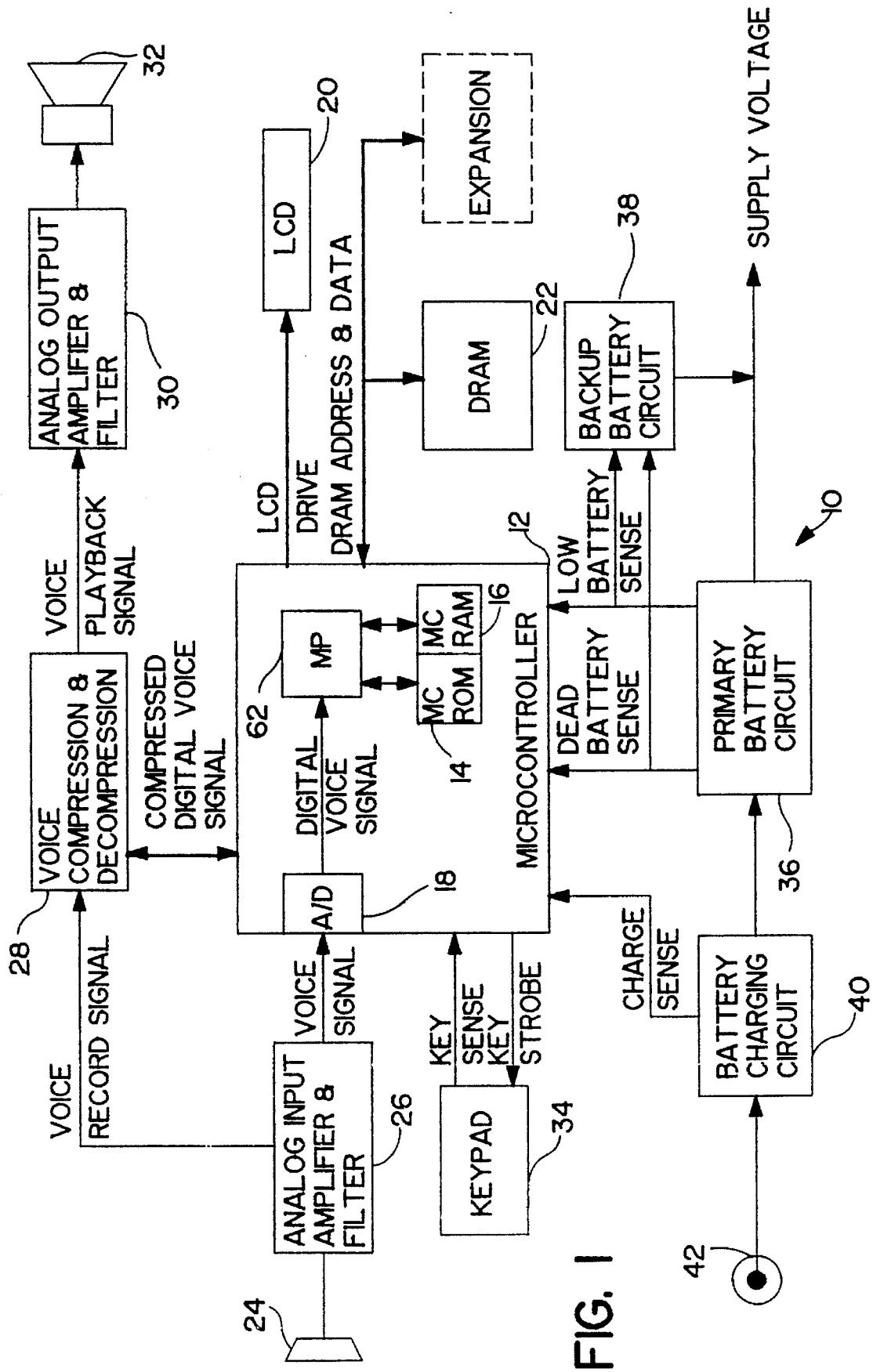
FIG. 1 is a block diagram of a voice activated personal organizer in accordance with the invention.

FIG. 1 is a block diagram of a voice activated personal organizer 10 in accordance with the invention. The description of FIG. 1 and of the various flow diagrams in subsequent figures of the drawings which relate thereto are provided by way of example only. Accordingly, it will be apparent to those skilled in the art that other arrangements and software routines are possible in accordance with the invention.

In the present example, the organizer 10 includes a microcontroller 12, which is the key component of the organizer 10 inasmuch as it manages operation of the overall system of the organizer 10 in addition to operating the voice recognition algorithms. The microcontroller 12 includes a ROM (read only memory) 14 which stores a program for operating the organizer 10 as well as static data used in implementing the functions of the organizer 10. The ROM 14 is shown in FIG. 1 as an internal part of the microcontroller 12, but it will be understood that the ROM 14 and other components like it can alternatively comprise separate components located external to the microcontroller 12.

Also contained within the microcontroller 12 is a RAM (random access memory) 16 which is used for local temporary storage of data necessary for the microcontroller 12 to fully implement the functions required. The microcontroller 12 further includes an A/D (analog-to-digital) converter 18 for converting inputted voice signals to digital form. The microcontroller 12 includes LCD (liquid crystal display) drive circuitry for driving an LCD 20.

In addition to the RAM 16 which is internal to the microcontroller 12, the organizer 10 has a larger amount of RAM memory external to the microcontroller 12, for more permanent storage of several types of data. This is accomplished by a DRAM 22, although it should be understood that other types of memories can also be used. As shown in dotted outline, additional expansion memories can be provided as necessary. The DRAM 22 stores "voice templates" that are collected during the set-up process to enable recognition of a specific user's voice. The DRAM 22 is also used to store the dates and times for any reminders, as well as phone numbers for the phone directory function. The DRAM 22 also contains "flags" for each such item indicating, for example, that a phone number is a home number or a work number, or that a reminder is to occur weekly, or daily, or one time only. The bulk of the DRAM 22 is used for the storage of digital voice recordings.

In the organizer 10 of FIG. 1, a sound transducer for incoming voice commands and messages from the user is provided by a microphone 24. The microphone 24 converts the acoustic waves generated by the user's voice into analog electronic signals, which are amplified and filtered by an analog input amplifier and filter 26. The analog input amplifier and filter 26 amplifies and filters the signals from the microphone 24 in such a way as to optimize the capabilities of the voice recognition algorithms employed by the microcontroller 12. At the same time, such analog signal is also amplified and filtered by the analog input amplifier and filter 26 in such a way as to optimize the recording quality. Consequently, the overall transfer function of the signal path from the microphone 24 to a voice compression and decompression circuit 28 is different from the transfer function of the path from the microphone 24 to the A/D converter 18 to implement the voice recognition algorithms. The difference is necessary because the optimal signals for the two processes, namely recording of messages and voice recognition, are different. Such differences are in part made necessary by the hardware approach to compression and decompression provided by the voice compression and decompression circuit 28.

As previously noted, the voice signal received by the microphone 24 and processed by the analog input amplifier and filter 26 is applied directly to the A/D converter 18 of the microcontroller 12 for voice recognition. The A/D converter 18, which could be external to the microcontroller 12 instead of forming an internal component thereof as shown, converts the analog voice signal into a digital signal which the microcontroller 12 can use. At the same time, voice signals to be recorded are provided by the analog input amplifier and filter 26 to the voice compression and decompression circuit 28. In the present example, the voice compression and decompression circuit 28 implements a Continuously Variable Slope Delta Modulation (CVSD) compression and decompression algorithm. Consequently, the circuit 28 is a form of A/D converter, but at the same time one that significantly processes and thus compresses the amount of digital data that results for conversion of the analog voice signal to the digital voice signal. This allows a minimum of memory to be used for recording the voice messages. The data comprising such voice messages is stored in the DRAM 22. The CVSD compression and decompression algorithm also converts the stored compressed digital voice signals back into analog voice signals for playback, via an analog output amplifier and filter 30 and a speaker 32. The analog output amplifier and filter 30 optimizes the sound quality for reproduction by the speaker 32.

Figure 2:
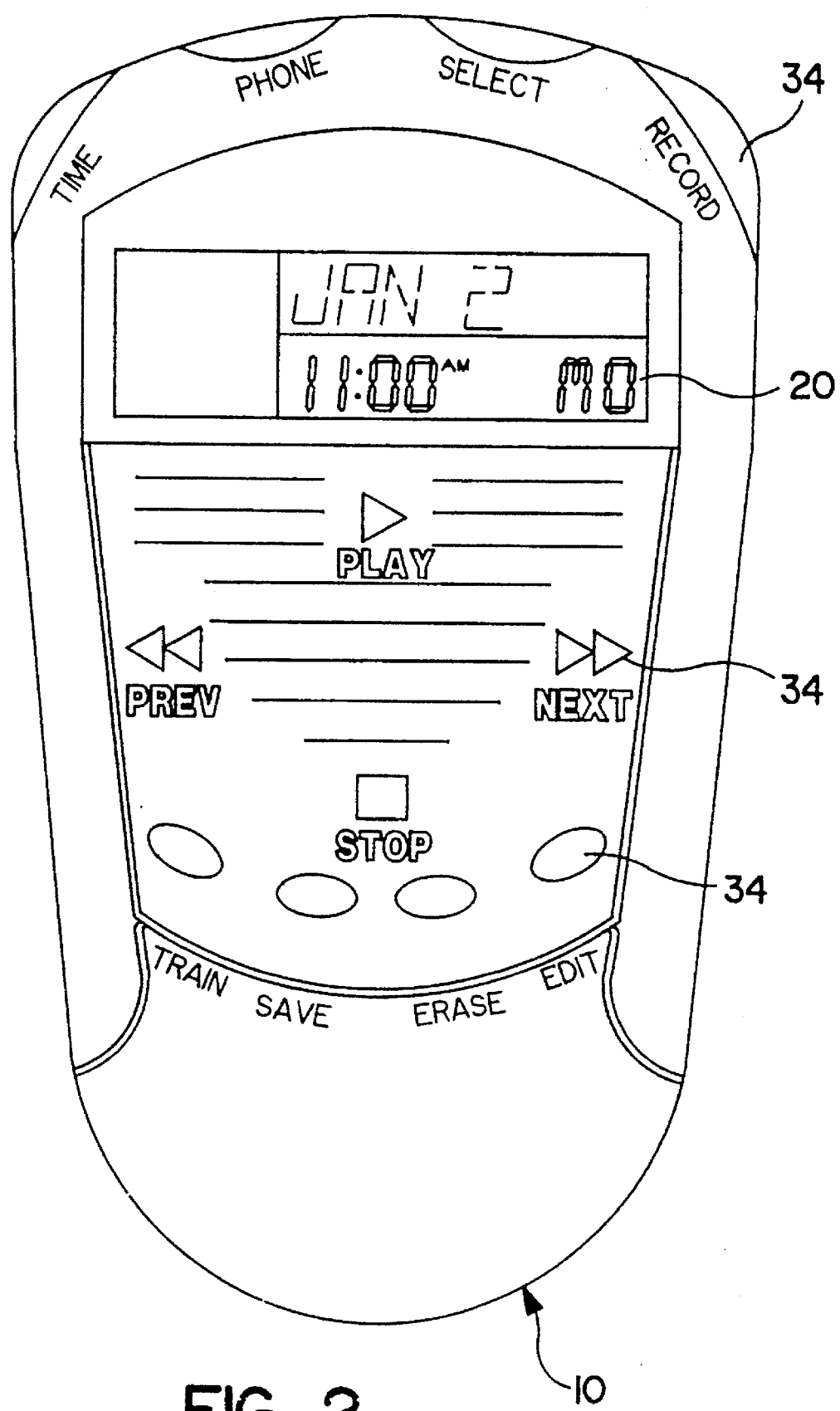
FIG. 2 is a plan view of the voice activated personal organizer electronically represented by the block diagram of FIG. 1 and showing the limited keypad made possible in accordance with the invention.

The LCD (liquid crystal display) 20 is utilized to visually feed back information to the user of the organizer 10. As shown in FIG. 2 as well as in FIG. 1, the organizer 10 has a keypad 34 of limited size, to enable the user to interact with the organizer 10. The keypad 34 has but 12 keys, which are denoted and used to perform functions as follows:

| Key | Function |
| --- | --- |
| record | used for making voice recordings |
| phone | used for phone directory input and retrieval |
| select | used to select functions for review/use |
| time | used for voice input of times/dates and other data |
| play | used for playing back recordings |
| next | used to advance to the next item |
| prev | used to move to the previous item |
| stop | used to abort the present operation |
| train | used for training the organizer to the user's voice |
| save | used to store information in the RAM |
| erase | used to eliminate information from the RAM |
| edit | used for entering editing and manual input modes |

As shown in FIG. 1, the organizer 10 is powered by a primary battery circuit 36 which is comprised of several rechargeable batteries coupled in series, together with a voltage regulator, and two voltage comparators which provide an indication of the status of the batteries in order to warn the user of the need for recharging the batteries, and so that the microcontroller 12 can shut down all operations other than maintenance of the time of day and the memory contents if the batteries become dangerously low. Whenever the batteries in the primary battery circuit 36 become low, a backup battery circuit 38 connects non-rechargeable backup batteries to power the organizer 10. If a comparator within the primary battery circuit 36 determines that the primary batteries therein are almost out of sufficient charge, the regulator shuts down, and only the backup batteries within the backup battery circuit 38 are used. In that instance, the microcontroller 12 immediately stops all operations other than minimal maintenance to prevent loss of the memory contents. A battery charging circuit 40 provides a regulated current to the primary batteries in the primary battery circuit 36, when an external charger is plugged into a charger jack 42. The battery charging circuit 40 automatically senses when a charger is plugged into the jack 42 and signals the microcontroller 12 accordingly.

Figure 3:
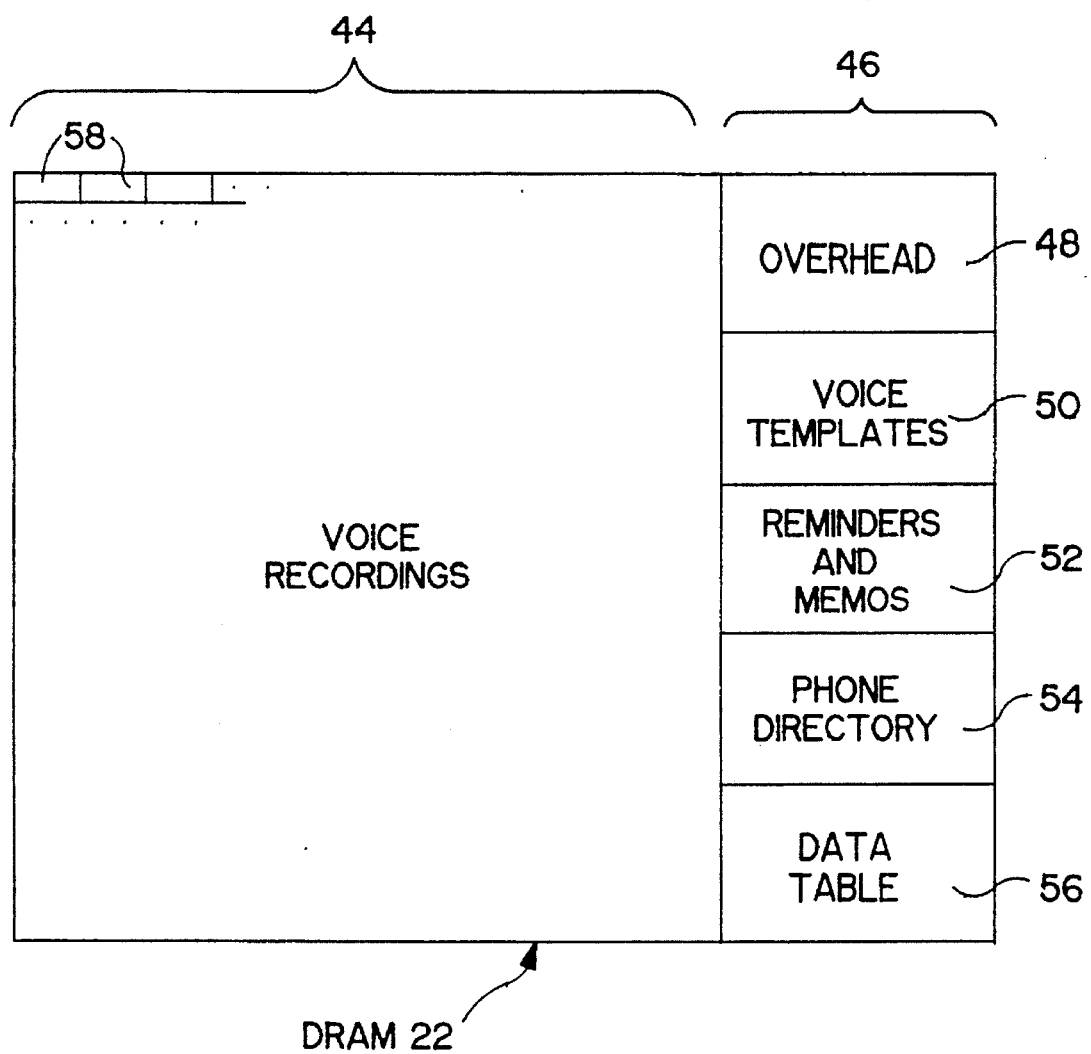
FIG. 3 is a pictorial representation of the different types of data stored in the DRAM of the voice activated personal organizer of FIG. 1.

The DRAM 22 stores data which is generated as the user uses the organizer 10. As shown in FIG. 3, the DRAM 22 is divided into two basic storage areas. A first such area 44, comprising the vast majority of the DRAM 22, is used for voice recordings. The remainder of the DRAM 22, as represented by a second area 46, is divided into five separate areas. A first one 48 of the five areas is an "overhead" storage area used in the operation of the personal organizer 10. The area 48 stores data used in maintaining the state of operation of the personal organizer 10. The area 48 is of fixed size, and the various data fields thereof are also fixed within such area.

A second one 50 of the five areas within the storage area 46 is used to store voice templates which are created when the user trains the personal organizer 10 to his or her voice. Because the number of words stored for recognition purposes is known, the size of the area 50 is fixed.

A third one 52 of the five areas within the storage area 46 contains data pertaining to reminders and memos, which are described hereafter. The area 52 is divided into 255 small segments, one for each memo and reminder allowed. There is status information indicating whether the item is a reminder, recurring reminder, or memo, as well as an indication of which recording it is associated with. The time of recording a memo, or the due time for a reminder, and the period of recurrence for a recurring reminder, are also stored in this area. The storage area 52 is of fixed length.

A fourth one 54 of the five areas within the storage area 46 contains data pertaining to the phone directory, described hereafter. For each entry in the phone directory, there is space for two voice templates for the name, together with space for four phone numbers which may be up to 20 digits in length, and an indication of which recording is associated with the directory entry. This storage area is also of fixed length.

A fifth one 56 of the five areas in the storage area 46 comprises a data table used to indicate where in the voice recording memory space each recording resides. This table is similar to file allocation tables utilized in managing disc drives in small computers.

The voice recording storage area 44 is logically divided into fixed blocks 58 that are 512 bytes long. Only a few of the blocks 58 are shown in FIG. 3, for simplicity of illustration. Each block 58 corresponds to approximately one-fourth second of recording time. Each recording is therefore a multiple of one-fourth second in length. As a recording is made, the starting one of the blocks 58 thereof is noted in the table. The data for each reminder, memo and the like "points" to a unique location in the table which "points" to a unique one of the blocks 58 in the voice recording area. As new recordings are made, the first available location in the table is assigned and the recording begins at the first available voice block 58. As recording progresses past the first one-fourth second, the next available one of the blocks 58 is used to continue the recording. This block 58 may be the very next one or it may not be. At the end of each block is a "pointer" to the next one for this recording. If the block is the last one for the recording, the pointer indicates that this is the end of the recording.

When a recording is erased from the storage area 44, it is only necessary to clear the entry thereof in the appropriate data area (memo/reminder or phone directory), clear the entry that was occupied thereby on the voice memory allocation table and mark the voice memory blocks 58 that were used, as being free. The voice data itself is not, in fact, erased. It is simply marked as "available", in the same manner as is done on discs in computers. Initially, recordings occupy contiguous groups of the blocks 58. However, as the recordings are erased and others are made, the recordings tend to become fragmented across non-contiguous ones of the blocks 58.

The internal RAM 16 within the microcontroller 12 is used to store information temporarily for fast access during each particular operation. For example, when voice recognition is to occur, the templates that are allowed for the particular item being accessed are pulled into the RAM 16. This is necessary because access to the RAM 16 is significantly faster than for the DRAM 22. As new operations proceed, the same memory space is reused for other purposes.

The microcontroller 12 operates to perform voice recognition in the same manner as described in the previously referred to copending applications, Ser. Nos. 07/915,112, 07/915,938 and 07/915,114. Such applications are incorporated herein by reference. As described in detail in co-pending application Ser. No. 07/915,112 for example, the A/D converter 18 may comprise an 8-bit converter which samples incoming data at a preassigned frequency such as 9.6 KHz. In that event, the A/D converter 18 outputs a digital signal representing the input analog voice signal. A microprocessor (MP) 62 within the microcontroller 12 processes the digital voice signal together with a voice recognition software routine forming part of a control program stored in the ROM 14. The digital voice signal is converted into an incoming voice template that is compared against previously stored voice templates of the user's voice, stored in the external DRAM 22. The program decodes the voice templates. Together with the external DRAM 22, the RAM 16 comprises a reference memory for temporary storage of data.

Thus, the analog voice signal is applied to the A/D converter 18 for conversion into an incoming digital voice signal. The reference memory, comprised of the DRAM 22 in conjunction with the RAM 16, stores a plurality of reference digital voice templates. The ROM 14 stores the control program. The microprocessor 62 which is coupled to the A/D converter 18, the ROM 14 and the RAM 16 generates an incoming digital voice template from the incoming digital voice signal at the output of the A/D converter 18. The microprocessor 62 then executes the control program to determine whether the incoming digital voice template is substantially equivalent to one of the reference digital voice templates, stored in the reference memory comprised of the RAM 16 and the external DRAM 22. The microprocessor 62 determines what action to take corresponding to a reference digital voice template, if the incoming digital voice template is found to have substantial similarity to the reference digital voice template.

Voice control is made possible by first voice training the collection of reference digital voice templates in accordance with the user's voice. Such templates are collected in the same manner as described in co-pending application Ser. No. 07/915,112. When voice training is complete, the personal organizer 10 is ready for use.

IDLE MODE/SELECT (FIG. 4)

Figure 4:
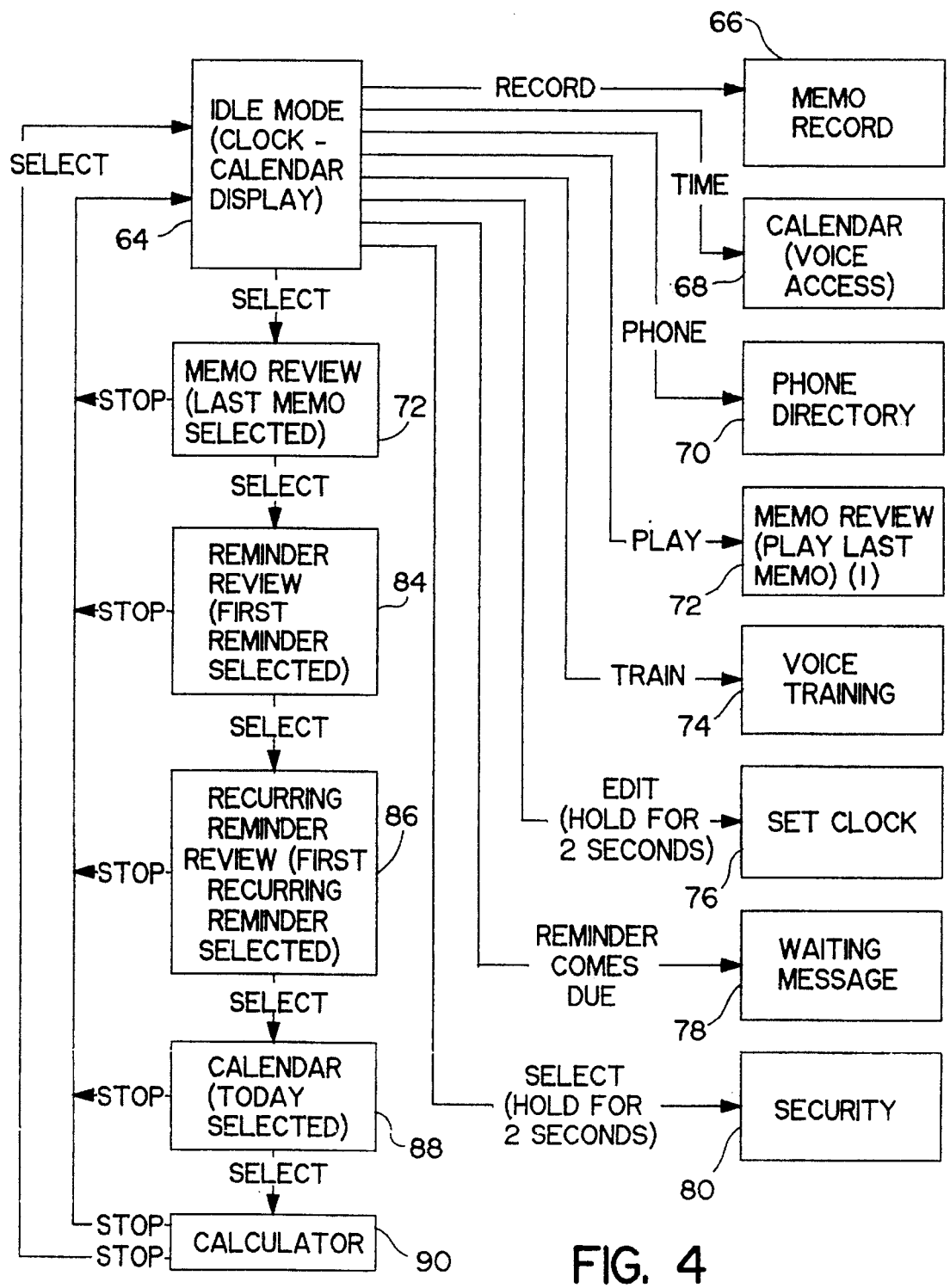
FIG. 4 is a flow diagram of the idle mode/select operation mode software routine implemented in the control program of the voice activated personal organizer of FIG. 1.

The basic program for the organizer 10 begins with an idle mode/select operation mode software routine, shown in the flow diagram of FIG. 4. When in such idle mode, as represented by a block 64, the clock and calendar are displayed by the LCD 20 as shown in FIG. 2. As shown in FIG. 4, various different operations may take place from the idle mode 64, including memo record 66, calendar (voice access) 68, phone directory 70, memo review (play last memo) 72, voice training 74, set clock 76, waiting message 78, and security 80.

As shown in FIG. 4, by pressing the silent button from the idle mode 64 memo review 72 may be selected, in which event the last memo is selected. Selection may also be made of reminder review 84, in which event the first reminder is selected. Further selections include recurring reminder review 86, in which event the first recurring reminder is selected, calendar 88, with today being selected, and calculator 90. The memo review 72, the reminder review 84 and the recurring reminder review 86 modes are described hereafter in connection with the flow diagram of FIG. 11.

As previously noted, the idle mode 64 shown in the flow diagram of FIG. 4 includes display of the current time of day, the date, and the day of the week, using the LCD 20. All operations other than those necessary to maintain the time of day, the memory contents, and to monitor the key states, are disabled, to minimize drain on the batteries. The idle mode 64 is exited if a key of the keypad 34 is pressed or if a reminder time comes due.

Typically, the first thing a user does with the organizer 10 is to set the clock to the current time and date (set clock 76) and then train the organizer to his or her voice (voice training 74). Once these items are completed, all other features will be fully operational. Until the voice training is completed, none of the voice recognition features will operate. Instead, they will result in a message "TRAIN" being displayed, to prompt the user to complete voice training.

SET CLOCK (FIG. 5)

Figure 5:
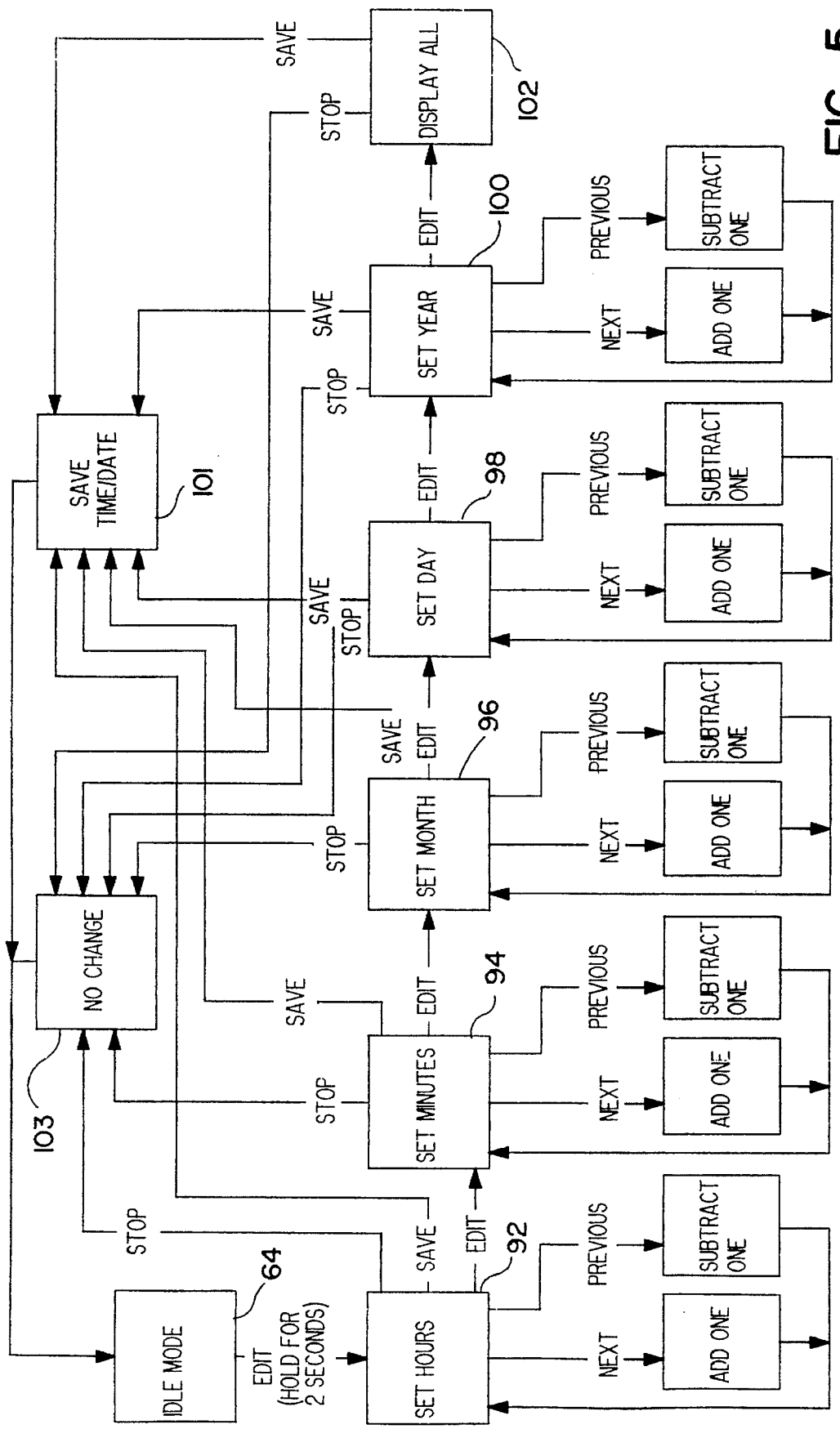
FIG. 5 is a flow diagram of the set clock operation mode software routine implemented in the control program of the voice activated personal organizer of FIG. 1.

The set clock function 76 of FIG. 4 is shown in detail in the flow diagram of FIG. 5. The user begins by holding the "edit" button for two seconds while in the idle mode 64. A simple press of the "edit" button results in a single beep being generated by the personal organizer 10, and this is used for editing. To prevent the clock setting procedure from inadvertently being initiated, the user must hold the "edit" button for a full 2 seconds until a subsequent double beep is heard. At this point, the current time and date are displayed with the hour field blinking. The user then presses the "next" button to advance the hour by one or the "prev" button to decrease the hour by one. When the correct hour is displayed (including AM or PM), the user presses the "edit" button to again move to the day field. The day field is edited in the same manner. The user again presses the "edit" button to move to the next fields, namely month, day and year, using the "next" and the "pref" buttons to change the entries, until the entire date and time are entered. At any point, the user can press the "save" button to accept the date and time as entered, or the "stop" button to revert to the time and date that were set before the user began the operation.

Thus, as shown in FIG. 5, pressing of the "edit" button for at least two seconds, while in the idle mode 64, initiates a series of operations including set hours 92, set minutes 94, set month 96, set day 98, set year 100, and display all 102. During each of the operations 92, 94, 96, 98, 100 and 102, pressing of the "next" button advances the display by one, while pressing of the "prev" button decreases the display by one. Each pressing of the "edit" button moves to the next field or operation along the chain of operations 92, 94, 96, 98, 100 and 102 for editing thereof. Pressing of the "save" button accepts the date and time as entered, as represented by a save time/date block 101. Pressing of the "stop" button reverts to the time and date that were set before the user began the operation, as represented by a no change block 103.

VOICE TRAINING (FIG. 6)

Figure 6:
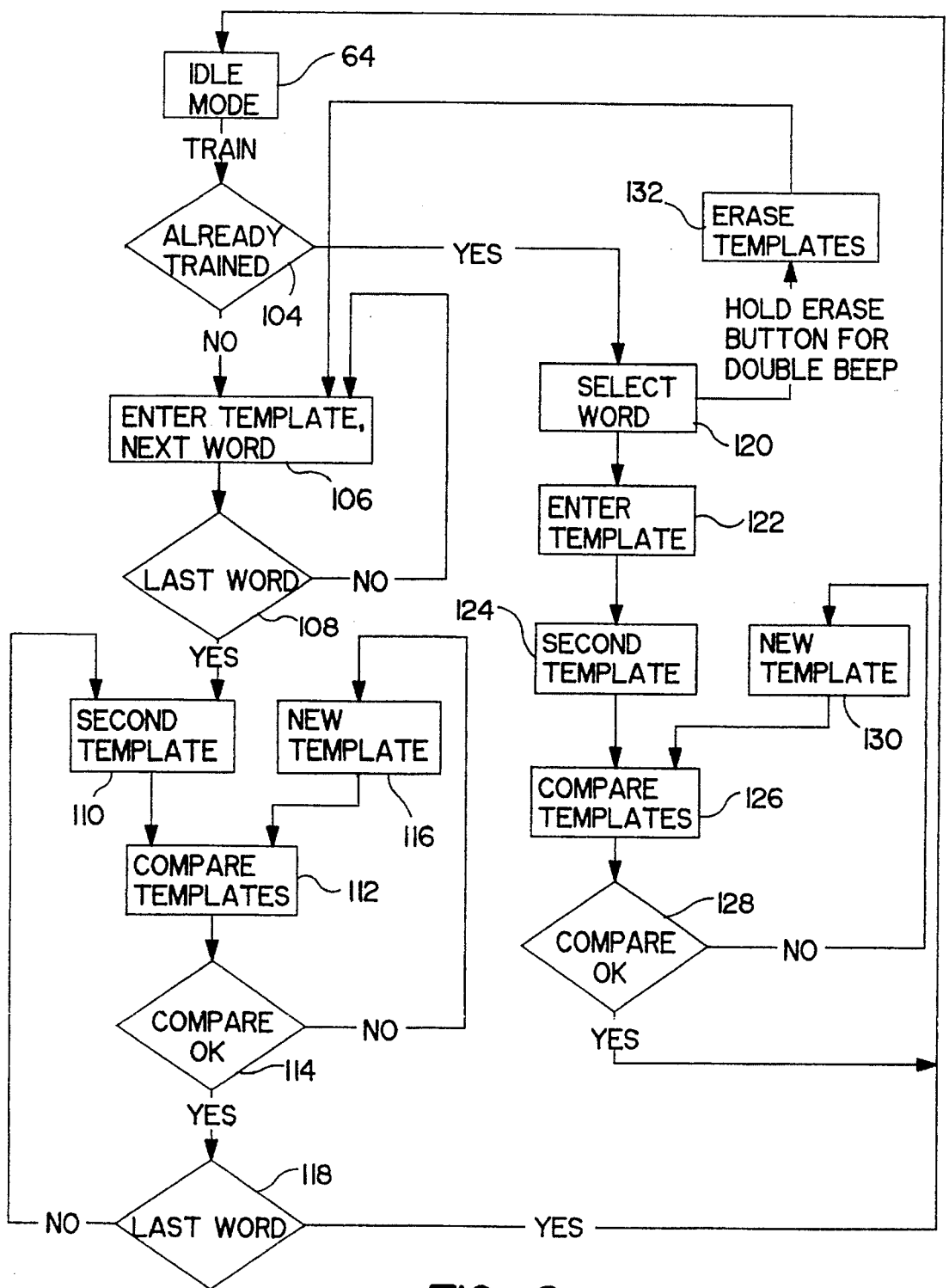
FIG. 6 is a flow diagram of the voice training operation mode software routine implemented in the control program of the voice activated personal organizer of FIG. 1.

The voice training function 74 of FIG. 4 is shown in detail by the flow diagram of FIG. 6. Voice training is initiated by pressing the "train" button while in the idle mode 64. If the user has not yet performed initial complete training, then complete training is begun. Otherwise, a "train one-word" process is begun.

Upon commencement of initial complete training, as determined in a step 104 in FIG. 6, the first word of the training list is displayed. The user holds the "time" button and speaks the word which is displayed. The template of the spoken word is stored, and the next word is displayed, in a step 106. The process continues until the last word is stored in this manner, as determined in a step 108.

When the template for the last word in the list is collected, a second template for each word is collected in the same order, as determined in a step 110. The collected template is compared to the previously collected template, in a step 112. If the template compares best with the previous template for the same word, as determined in a step 114, then it is saved and the organizer 10 progresses to the next template. If it does not match the previous template for this word, then the user is asked to repeat the word for collecting a third template, in a step 116. The process repeats until there are two templates for each word that match. When this has been accomplished for all words in the list, the organizer 10 returns to the idle mode 64, in a step 118.

If the train mode is entered when there are existing templates, then the user may train a word of his or her choice, as represented by a step 120. This is useful to correct problem words that are not being recognized properly. The user presses either the "next" or the "prev" button to scroll through the list of words. When the word the user wants is displayed, the user proceeds to hold the "time" button and collect two templates, as represented in steps 122, 124, 126, 128 and 130.

If the user wants to completely retrain all templates, then after entering the train mode, the user holds the "erase" button until a double beep is heard, as represented by a step 132. All templates are erased and the complete training process is initiated.

MEMO RECORD (FIG. 7)

Figure 7:
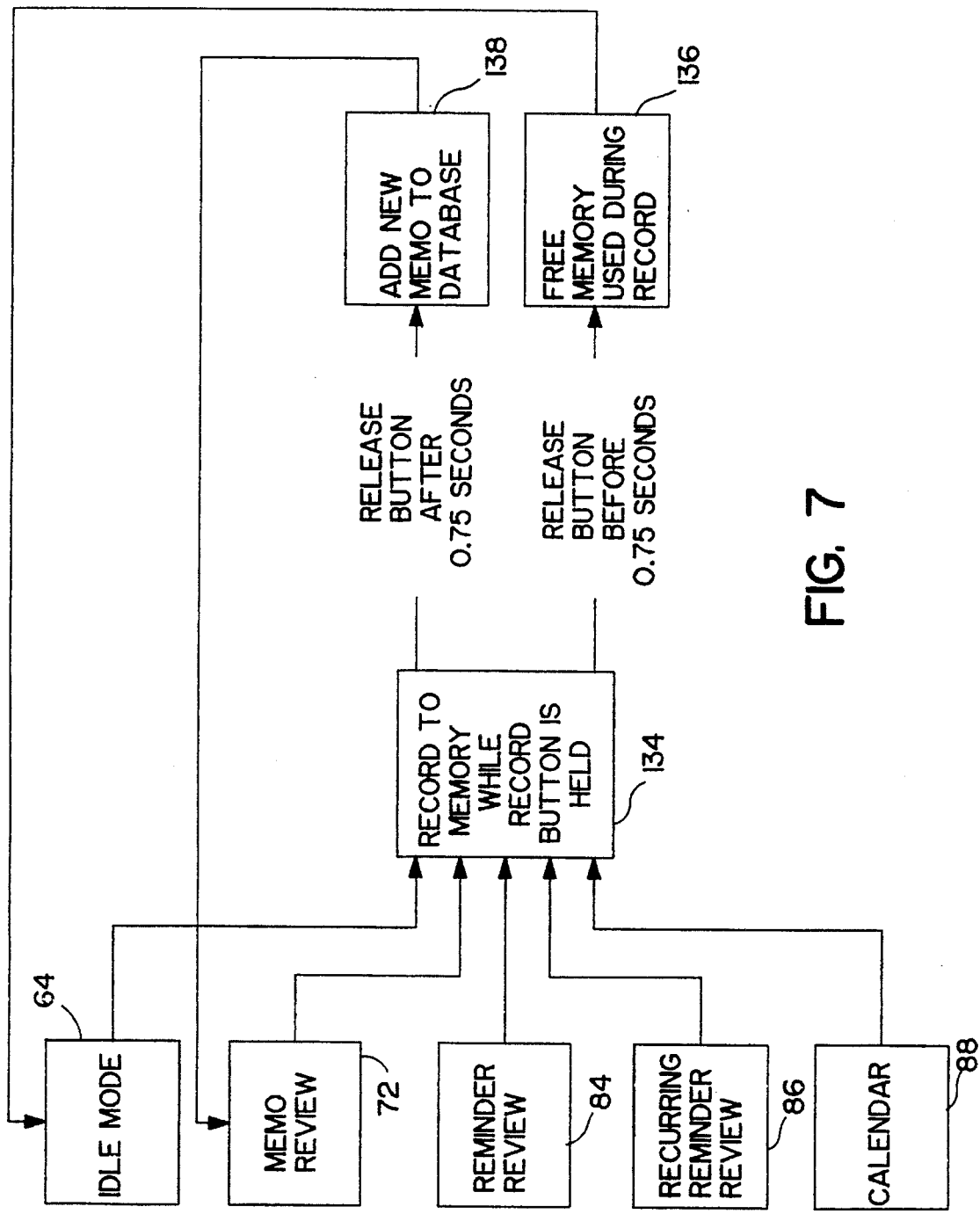
FIG. 7 is a flow diagram of the memo record operation mode software routine implemented in the control program of the voice activated personal organizer of FIG. 1.

Memo recording can be accessed from several states in the overall program flow, as shown in the memo record flow diagram of FIG. 7. At these points in the program flow, the user holds the "record" button and speaks into the organizer 10. The microcontroller 12 activates the analog circuitry including the voice compression and decompression circuit 28, and begins to store the incoming recording data in the DRAM 22. This is represented in a step 134 in FIG. 7, in association with the idle mode 64, the memo review 72, the reminder review 84, the recurring reminder review 86, and the calendar 88. If the "record" button is released before 0.75 seconds has elapsed (i.e., before three of the blocks 58 shown in FIG. 3 are filled), then the recording is "erased" automatically and the idle mode is returned to, as represented by a step 136 in FIG. 7. Conversely, if the recording is longer than 0.75 seconds, then the recording is added to the data memory and the memo review mode 72 is returned to with the new memo selected, as represented by a step 138. The 0.75 second minimum time is implemented to prevent unintentional "silent" memos from being recorded due to accidental pressing of the "record" button.

REMINDER SETTING (FIG. 8)

Reminders are built on memos. A due time (alarm time) is added to a memo by the user. When the due time arrives, the organizer 10 alerts the user with a short series of beeps, as described hereafter. When a memo is recorded, it can immediately be turned into a reminder. A memo may also be turned into a reminder at any later time, simply by selecting the memo.

Figure 8:
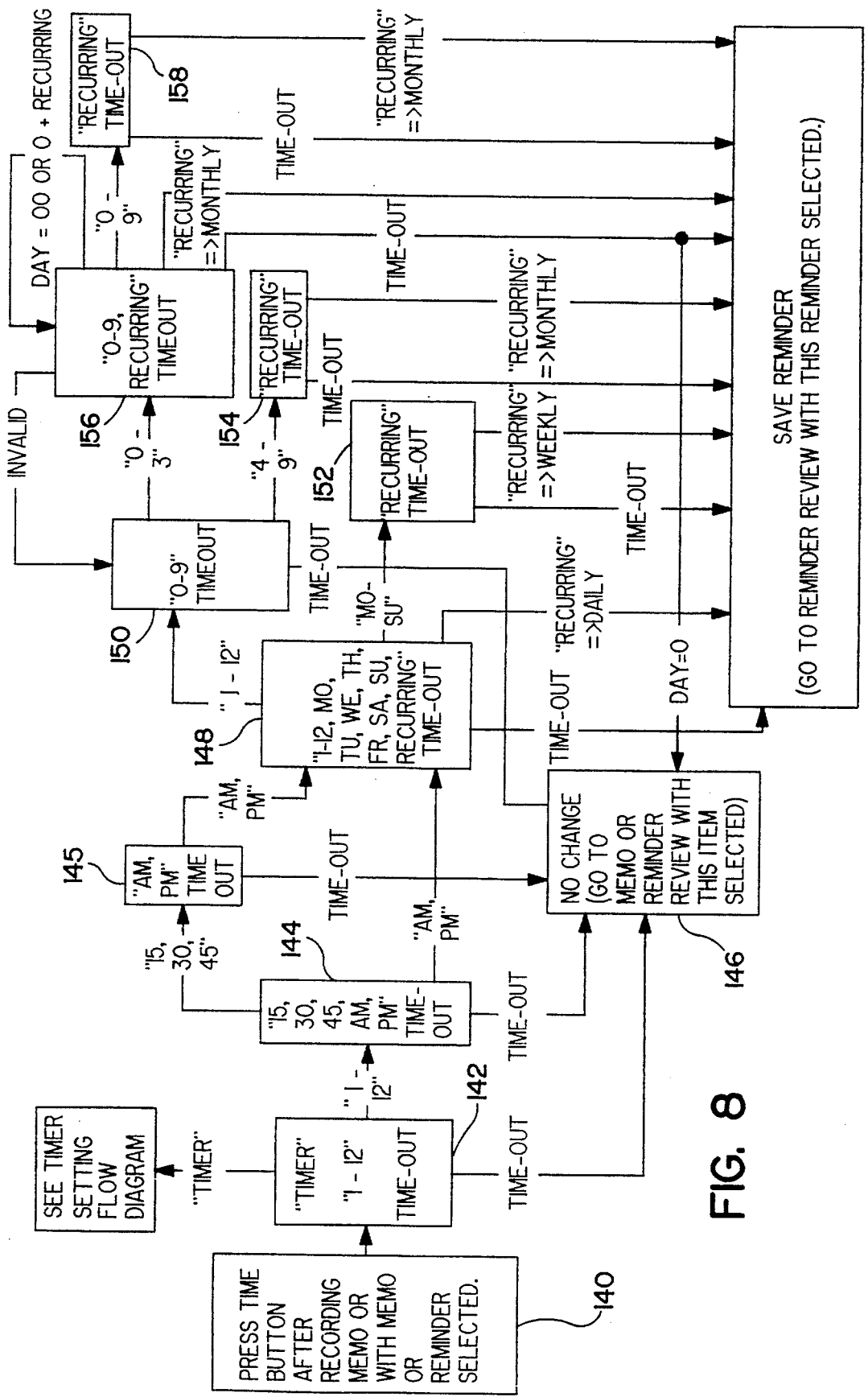
FIG. 8 is a flow diagram of the reminder setting operation mode software routine implemented in the control program of the voice activated personal organizer of FIG. 1.
Figure 19A:
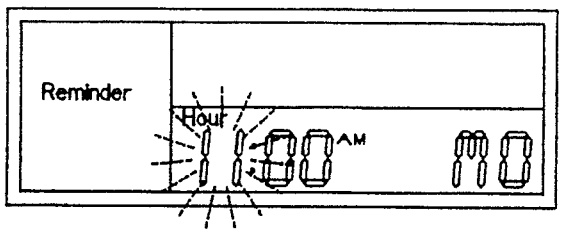
FIGS. 19A–19G are illustrations of different visual displays provided by the voice activated personal organizer of FIG. 1 during various operations thereof.
Figure 19B:
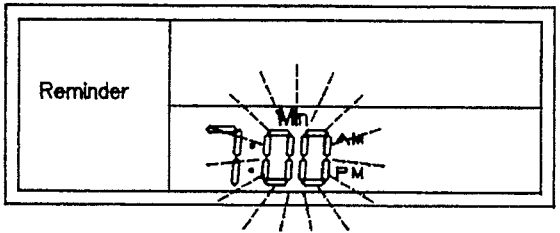

FIG. 8 is a flow diagram of the reminder setting, which shows the process of creating a reminder. The user begins by selecting the memo to be made into a reminder (or an existing reminder for which a new due time is desired) and then holding the "time" button, as represented by a step 140. The organizer 10 then prompts the user for the information needed, so that the user does not have to remember the exact procedure required. First of all, the current time and day are displayed with the hours field blinking to indicate that the user should speak the hour. See the display shown in FIG. 19A. If the user speaks the word "timer", then the process changes to a timer input, as described below. For a reminder, the user recites the number for the hour desired (1–12), in a step 142. The hour recognized is displayed and the minutes field along with the AM/PM is selected and proceeds to blink, as shown in FIG. 19B. This is represented by a step 144 in FIG. 8. The user may state either a one-fourth hour (15, 30 or 45) or "AM" or "PM" if the desired time is on the correct hour. If a one-fourth hour is stated, then the AM/PM which is chosen blinks, and the user must state either "AM" or "PM". This is represented in a step 145.

At this point, the time setting is complete. During the preceding entry process, and for the remaining data entry, there is a 0.5 second time-out that will occur if the user releases the "time" button. If the user releases the "time" button for longer than 0.5 seconds, then the reminder time is either saved as entered or, if the entered data is incomplete, then no change is made and the item reverts back to its former state, as represented by a step 146. The minimum entry required is as previously described, up to and including AM/PM.

If the user stops after AM/PM entry, then the reminder is saved and said to alert the user at the next occurrence of the time entered (either later today or the next day).

Figure 19C:
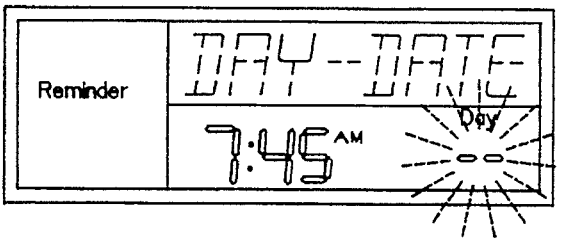

The user may continue to hold the "time" button and enter a day or date, as represented in a step 148. At this time, the day field blinks and "DAY-DATE" is displayed to indicate to the user that either a day (Sunday through Saturday) or an entire date (11/25 for example) may be entered, as shown in the display of FIG. 19C. The user may also say the word "recurring" at this point, to make a daily recurring reminder, as discussed below. If a day of the week is recognized, then date entry is completed and the reminder will alert the user at the next occurrence of the time and day entered.

Figure 19D:
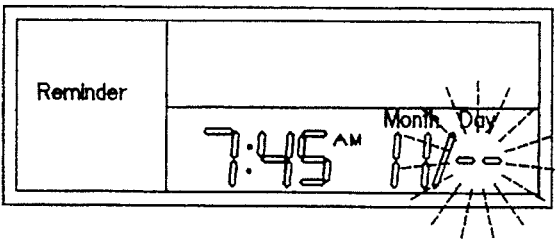
Figure 19E:
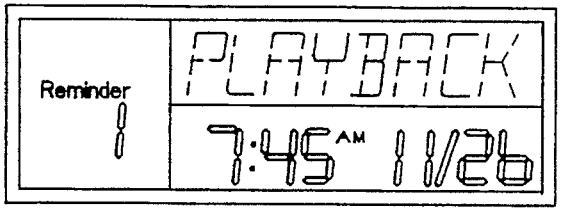

If a number is entered, it is placed in the month field and the day field continues to blink, as shown in FIG. 19D. The user proceeds to enter the day of the month, one digit at a time. If the day is the 1st through the 9th, then the user stops after speaking one digit. If the day is 10 or greater, the user must speak each digit individually. Unless the date requested is invalid, the reminder is saved as entered, as shown in the display of FIG. 19E.

At the end of any valid time/date entry, the user may say the word "recurring". The reminder is thereby made a recurring type reminder, and a period of recurrence is assigned based on the amount of information entered. If the user stops after entering AM or PM, the word "daily" is displayed and blinks. If a day of the week was entered, the word "weekly" is displayed and blinks. If the entire date was entered, then the word "monthly" is displayed and blinks. The user can press the "next" or "prev" buttons to scroll the allowable periods (daily, weekly, monthly or yearly). When the desired period is displayed, the user can press the "save" button to record this entry, or wait for a 10-second time-out to automatically save it.

The day portion of a date entry is represented in steps 150 and 156. The "recurring" functions are represented in steps 152, 154, 156 and 158. Each of these steps involves spoken words (shown in quotes) or a time-out, as described above.

MANUAL ENTRY (FIG. 9)

The user may use a manual method of entering a reminder time/date rather than voice input. Manual entry, as shown in the flow diagram of FIG. 9, begins with the pressing of the "edit" button. The process is similar to that for setting the clock time previously described. Namely, the user scrolls through the choices for each field, using the "next" and the "prev" buttons to increase or decrease each field by one. The user moves on to the next field by pressing the "select" button.

Figure 9:
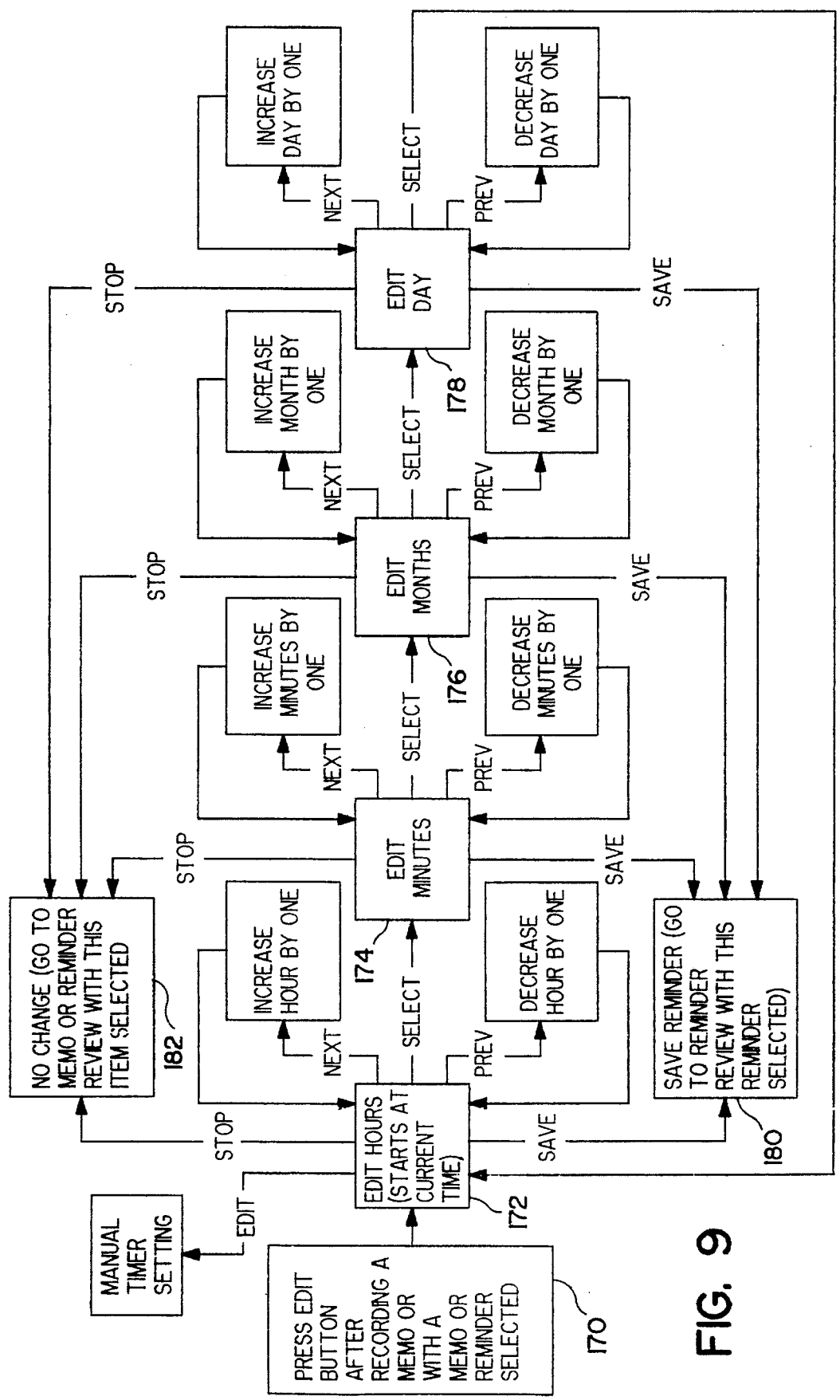
FIG. 9 is a flow diagram of the manual reminder operation mode software routine implemented in the control program of the voice activated personal organizer of FIG. 1.

Thus, as shown in FIG. 9, the pressing of the "edit" button after recording a memo or with a memo or reminder selected, begins the manual entry process as represented by a step 170. The hour field is entered for editing, as represented by a step 172. The editing process begins at the current time, and the "next" and "prev" buttons are used to increase or decrease the hour by one, respectively. Pressing of the "select" button moves to the edit minutes field as represented by a step 174. Following editing of the minutes, again using the "next" or "prev" buttons, the user uses the "select" button to advance to the edit months field, as represented by a step 176, and then to an edit day field as represented by a step 178. Pressing of the "select" button one more time returns to the step 172.

As with voice entry, only complete and valid entries are saved. Invalid or incomplete entries revert to their former state. Once a valid entry is inputted, the user can hold the "edit" button for a double beep to make this a recurring reminder. The user can then choose the period of recurrence in the same manner as is done for voice input. As represented by a step 180 in FIG. 9, pressing of the "save" button in any of the steps 172, 174, 176 or 178 saves the reminder by going to reminder review with the reminder selected. Pressing of the "stop" button within any of the steps 172, 174, 176 and 178 indicates no change, in which event the system goes to memo or reminder review with the item selected, as represented by a step 182.

TIMERS (FIG. 10)

Timers are a variation of reminders. The user can set a timer to go off in a period of time measured from the moment the timer is set, up to 23 hours and 59 minutes.

A timer setting is begun with the user saying the word "timer" as the first word in setting a reminder. The process is shown in the flow diagram of FIG. 10. From the reminder setting flow diagram of FIG. 8, which is represented by a block 190, saying the word "timer" leads to a step 192 in which the user states a one- or two-digit number, and follows it by stating "hour", "hours" or "minutes" as represented in steps 194, 195, 197, 198, 199 and 201. If the user sets a number of hours first, the user can follow with a second one- or two-digit number, followed by stating "minutes".

Figure 10:
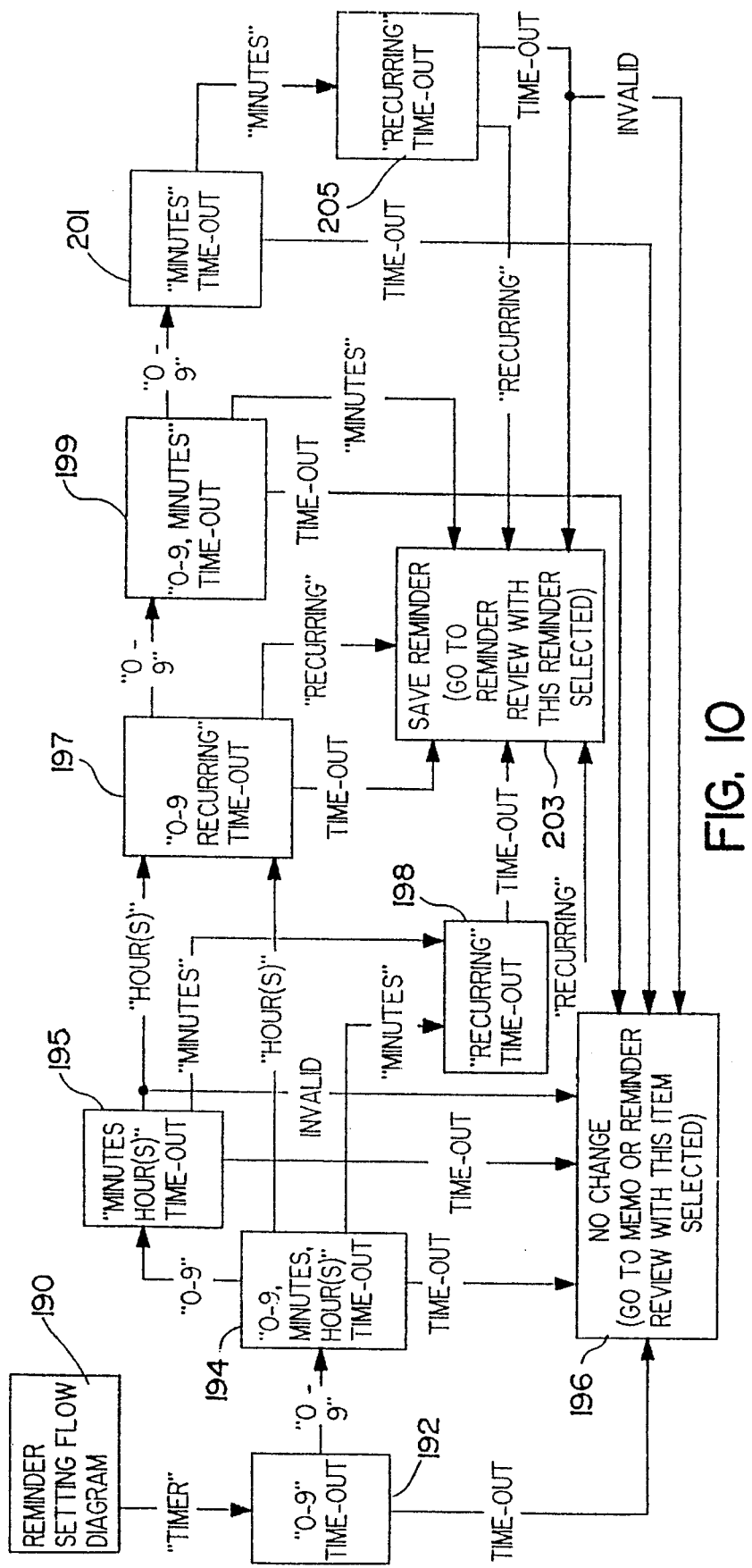
FIG. 10 is a flow diagram of the timer setting operation mode software routine implemented in the control program of the voice activated personal organizer of FIG. 1.

As with reminders, when the "time" button is released, there is a 0.5 second time-out after which the timer is saved. As shown in FIG. 10, a time-out with an incomplete entry results in a no change step 196, in which event the system goes to memo or reminder review with the item selected. On the other hand, a time-out with a complete entry at steps 197 or 205 results in a save reminder step 203.

After the user states "hour", "hours" or "minutes", the user may proceed to state "recurring". A recurring timer alerts the user with a period of recurrence equal to the timer setting. For example, if the timer is set for 8 hours, the user is alerted every 8 hours from the time that the timer is set.

Manual entry for the timer is initiated for manual entry of a reminder. After pressing the "edit" button to start manual entry, the user presses "edit" again to change to the timer format. As with reminders, the user presses "next" or "prev" to set the desired number for each field, and presses "select" to move from the field. In this case, there are only two fields, hours and minutes. A timer can be made recurring manually by holding the "edit" button for a double beep.

MESSAGE REVIEW (FIG. 11)

As described in connection with the idle mode/select flow diagram of FIG. 4, the user can review his or her messages by type, in terms of memos, reminders and recurring reminders. As represented by a block 200, in FIG. 11 which is a message review flow diagram, the user may press the "select" button to reach the desired category. From the idle mode (clock display), the user presses once to get to memos, twice to get to reminders and three times to get to recurring reminders. There is also a shortcut for memos from the idle mode, achieved by the user pressing "play" with the memo category being selected and the last memo recorded being automatically played back.

When the memo category is selected, the last memo to be recorded is defaulted to. Because memos are numbered in the order that they are recorded, such memo will be the Nth memo, where N is the number of memos presently saved. When the reminder or recurring reminder categories are selected, the next reminder or recurring reminder to come due (i.e., 1) is defaulted to. The message review flow diagram of FIG. 11 demonstrates this process.

Once the category is selected, the user has many options. Pressing "stop" exits back to the idle mode. Pressing "select" proceeds to the next category. Pressing the "record" button begins the recording of a new memo. Pressing the "time" button sets a reminder time for the message selected. Pressing the "edit" button begins manual entry or editing of a reminder time. Holding the "erase" button for a double beep erases the message.

Only the "play", "prev" and "next" buttons are used for actual review of the messages. The user presses "play" to play back the selected message. Pressing "next" advances to the next message, automatically playing it. Pressing the "prev" button moves to the previous message, automatically playing it. The user does not have to wait until the playback of a message is complete before moving to the next or the previous message. Pressing the "next" or "prev" button during playback aborts the playback and moves to the next or previous message, automatically playing it back. The selection of messages "wraps around". In other words, if the last memo is selected, pressing "next" moves to the first memo. Likewise, if the first one is selected, pressing "prev" moves to the last one.

While a message is being played back, the user can press the "stop" button to pause the playback. The user presses "play" to resume playback where it was paused. Pressing "stop" while playback is paused will cause the "pause" display to be removed and the current memo to still be selected. Pressing "play" at this point starts playback from the beginning of the message. Any time a message is displayed but is not being played back and is not paused, the user can press "stop" to return to the idle mode.

At any point in the review process where a message is not being played back, there is a 30-second time-out that causes the same action that would occur if the stop button were pressed. The flow diagram of FIG. 11 applies to memo review, reminder review, and recurring reminder review. When entered using the "select" button, the last recorded memo or next reminder or recurring reminder to come due is defaulted to. When entered by creation/editing of a message, that message is defaulted to. As noted, message numbers are assigned and messages are reviewed chronologically. Memos are done by the time recorded, while reminders and recurring reminders are done by the time that they are to come due. Timers and recurring timers show count-down to the time they will come due. The text displayed depends on the message type. Memos display "RECORDED", reminders display "PLAYBACK", timers display "PLAY IN", recurring reminders display "DAILY", "WEEKLY", "MONTHLY", or "YEARLY".

Figure 11:
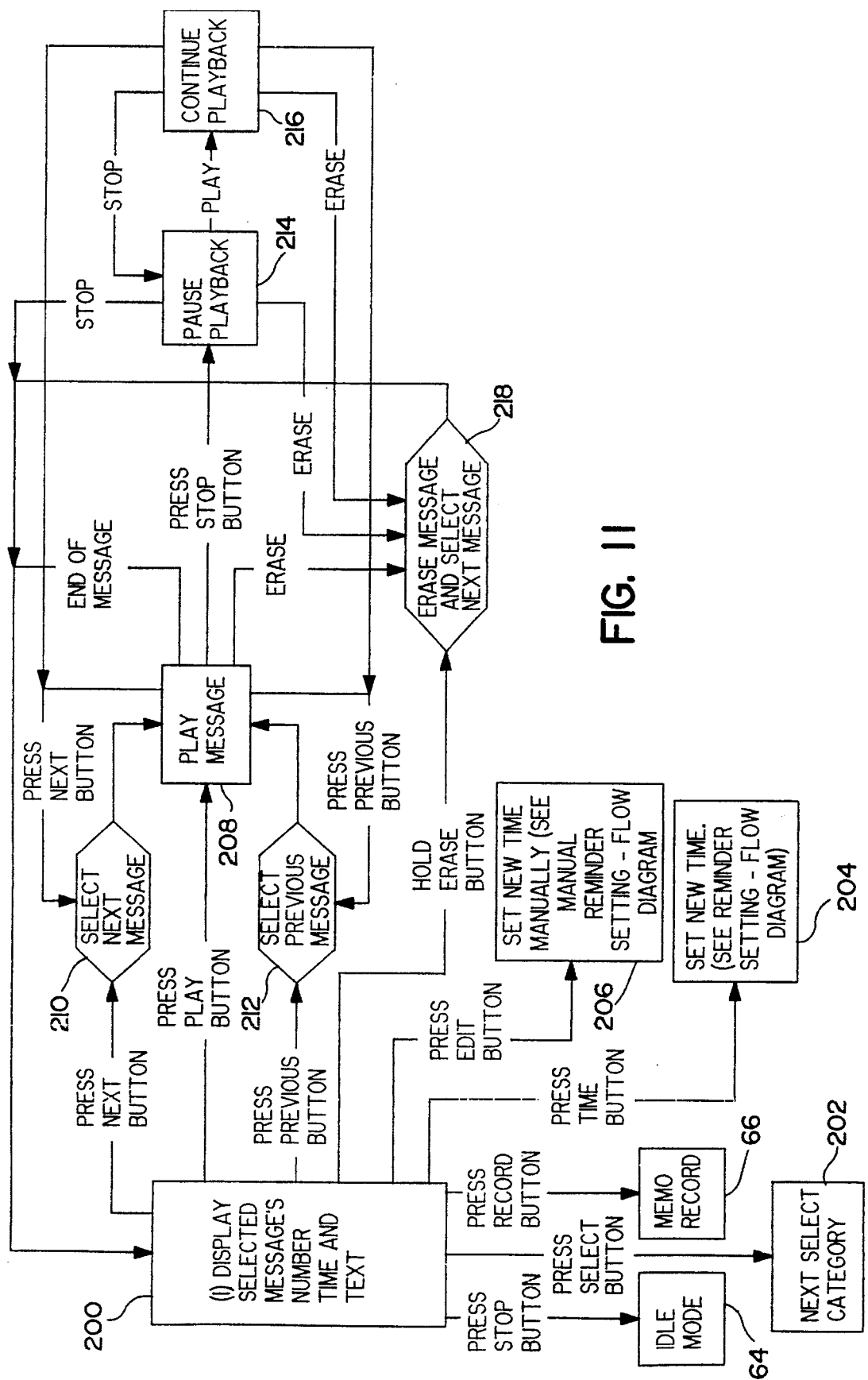
FIG. 11 is a flow diagram of the message review operation mode software routine implemented in the control program of the voice activated personal organizer of FIG. 1.

From the block 200 of FIG. 11, pressing the "stop" button reaches the idle mode 64. Pressing the "select" button results in selection of the next category, represented by a step 202. Pressing the "record" button results in memo record 66. Pressing the "time" button sets a new time, as represented by a step 204. Pressing the "edit" button sets the new time manually, as represented by a step 206.

From the block 200, pressing of the "play" button results in playing of the message, as represented by a step 208. Pressing of the "next" button proceeds to the play step 208 through a step 210 in which the next message is selected. Pressing the previous or "prev" button proceeds to the playing step 208 through a step 212 in which the previous message is selected. Pressing of the "stop" button results in the pause of playback, as represented by a step 214. Pressing the "play" button continues playback, as represented by a step 216. At this point, however, pressing of "stop" returns to the block 200. Pressing of "erase" at any of the various steps results in erasure of the message and selection of the next message, as represented in a step 218.

WAITING MESSAGES (FIG. 12)

Whenever a reminder or a recurring reminder (including timers) comes due, the organizer 10 generates a short sequence of beeps to alert the user. The user is locked out of all other operations until he or she either listens to all waiting messages or defers them. If the user does not respond, the beep sequence repeats as follows:

1. Every 5 minutes until 15 minutes past due.
2. Every 15 minutes until 2 hours past due.
3. Every hour until 12 hours past due.
4. After 12 hours, there is no more beeping.

Figure 12:
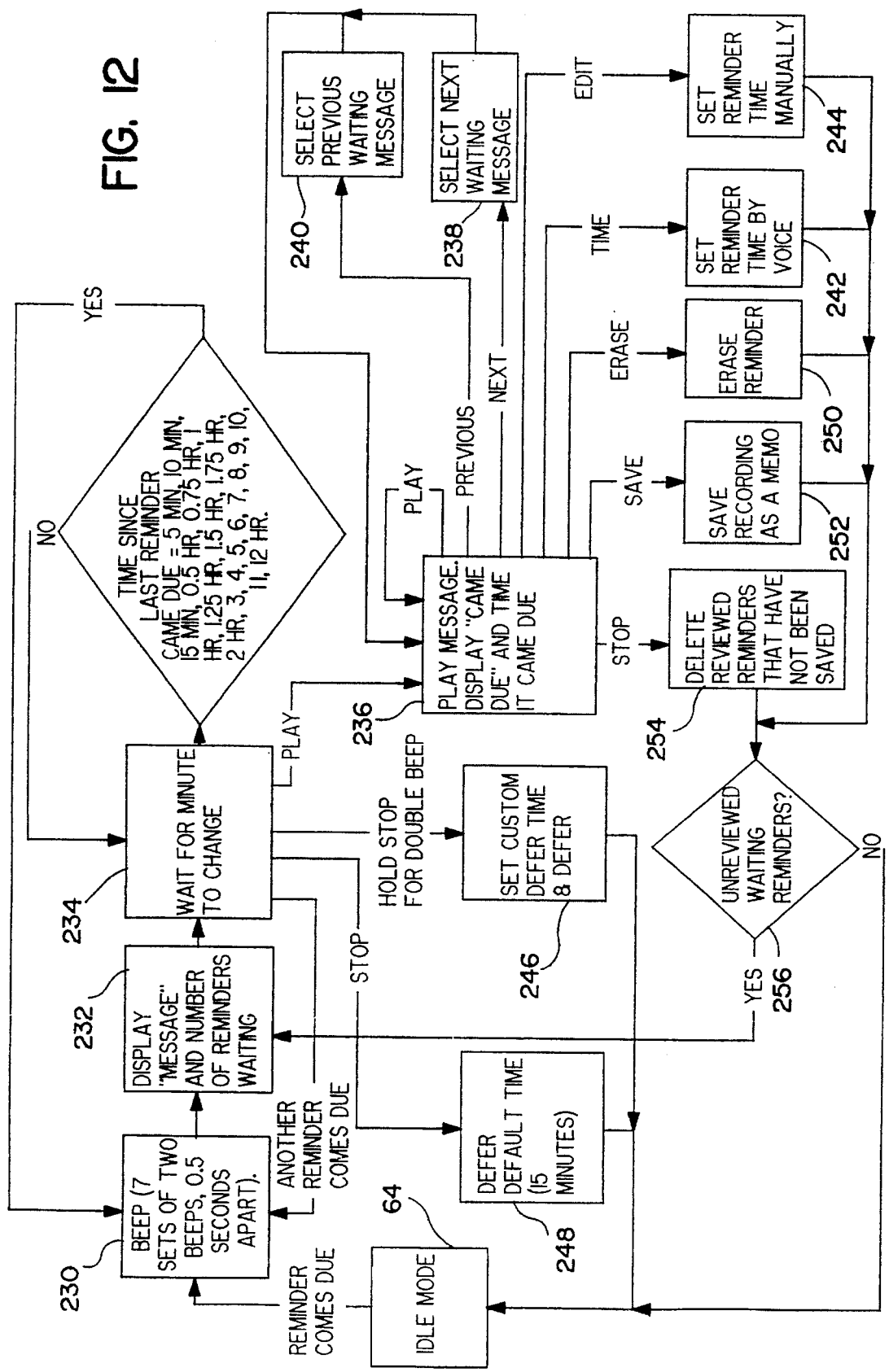
FIG. 12 is a flow diagram of the waiting message operation mode software routine implemented in the control program of the voice activated personal organizer of FIG. 1.

This is shown in FIG. 12 which is the waiting message flow diagram.

Figure 19F:
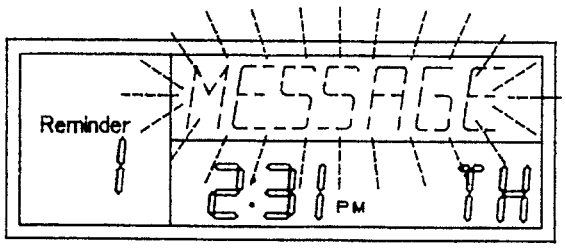

As shown in FIG. 12, from the idle mode 64 a step 230 occurs when a reminder comes due. There are seven sets of two beeps, 0.5 seconds apart. After the beeps have occurred, the word "MESSAGE" is displayed and blinks, as represented by a step 232. The "message" display is shown in FIG. 19F. Every time a minute passes, the organizer 10 automatically checks to see if other messages have come due, as represented in a step 234. If one or more messages have come due, then the organizer 10 beeps again, updates the number of messages on the display and returns to the "message" display. When this display occurs, the user has two options.

Figure 19G:
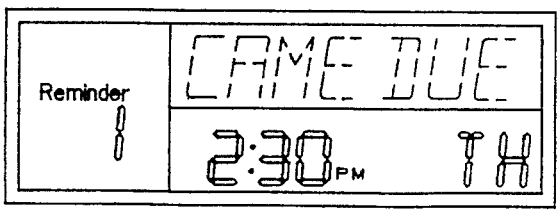

Typically, the user will press the "play" button to begin review of the waiting message or messages, as represented in a step 236. The display is shown in FIG. 19G. As each waiting message is played, the user can use the "next" and "prev" buttons to move from message to message. The only difference between review of waiting messages and review of messages that have not come due is that, for waiting messages, there is no automatic playing of the message when the "next" or "prev" buttons are pressed. Selection of the next waiting message by pressing of the "next" button is represented in a step 238. Selection of the previous waiting message by pressing the "prev" button is represented by a step 240.

The user can also set a new playback time for a reminder after reviewing it. This is done by either holding the "time" button and entering a due time by voice, as represented by a step 242, or by pressing the "edit" button and entering the new time manually, as represented by a step 244.

When playback of a message is completed, there is a 30-second time-out after which the review process is exited. Pressing the "stop" button has the same effect. Upon exiting the review mode, if there are still messages that have come due that have not been reviewed, the "MESSAGE" display is returned. If all waiting messages have been reviewed, then the idle mode 64 is returned to.

A second option which the user has is to defer the waiting messages by pressing the "stop" button. This effectively sets all of the waiting reminders to occur again in 15 minutes, thereby freeing the features of the organizer 10 for user access. Deferring is represented by a step 248. If the user wishes to defer for a different period of time, he or she holds the "stop" until a double beep is heard, as represented in a step 246, and "SET DEFER" is displayed. The user then keys in a new defer period in the same way that a timer is set manually.

The user may also change the default deferral time of 15 minutes by holding the "time" button for a double beep at the idle clock display and setting a new default defer time in the same manner.

As noted, from the play message step 236, pressing of the "erase" button erases the reminder, in a step 250. Pressing the "save" button saves the recording as a memo, as represented in a step 252. Pressing "stop" deletes reviewed reminders that have not been saved, as represented in a step 254. Inactivity for 30 seconds has the same effect, in this instance, as pressing the "stop" button. In the step 254, recurring reminders are not automatically deleted. Whether or not there are unreviewed waiting reminders is represented by a step 256.

CALENDAR (FIG. 13)

Figure 13:
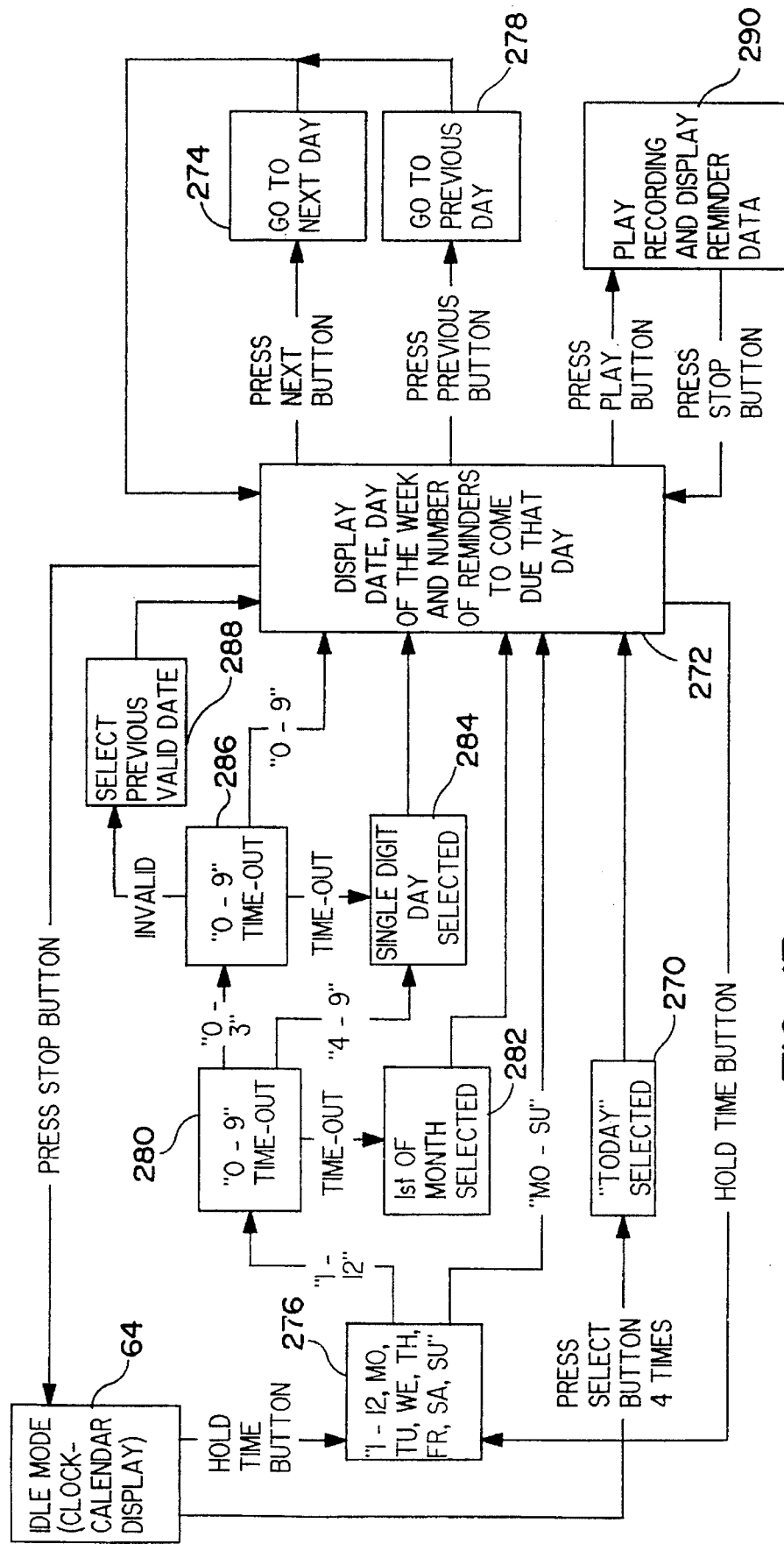
FIG. 13 is a flow diagram of the calendar operation mode software routine implemented in the control program of the voice activated personal organizer of FIG. 1.

The calendar mode, as shown in the flow diagram of FIG. 13, allows the user to review all of the reminders and recurring reminders for a single day combined. As shown in the idle mode flow diagram of FIG. 4, there are two ways to access the calendar.

The calendar may be accessed by pressing the "select" button as represented in a step 270. The calendar follows the review of recurring reminders in the select process. When the calendar is selected, the display, as represented by a block 272 shows the present date and the day and the number of reminders and recurring reminders for that day. The user can either press the "next" button to move forward to another day, as represented in a step 274, or hold the "time" button and speak a day or date, as represented in a step 276 to go to another day. When at another day, the user can use the "next" or "prev" buttons to move around from day to day, or the user can hold the "time" button to do so by voice. Moving to the previous day by pressing the "prev" button is represented in a step 278. Holding of the "time" button provides a shortcut from the idle mode. The user simply holds the "time" button and states the day or date desired.

The only dates shown for the calendar are from the present day to a year in the future (less one day). Scrolling with the "next" and "prev" buttons stops at these extremes. By voice, the days of the week cause the calendar to "jump" to today or one of the following six days. A date is entered in the same manner as is done for reminders. The numbers 1–12 are used for the month, followed by a one- or two-digit day. This is represented by steps 280, 282, 284, 286 and 288.

When the day desired by the user has been selected, the user may press "play" to effectively enter the day, beginning with the playing back of the first reminder or recurring reminder to come due on that day, as represented in a step 290, and with the due time and other data shown on the display as is done in the review of messages previously described. In this case, the messages begin with the first one through the number due for that day, according to the time that they are due. The user moves from message to message, using the "prev" and "next" buttons. The newly-selected message is automatically played back in the usual fashion.

When the user is finished reviewing the messages for a particular day, pressing of the "stop" button returns to the display of the date and day, thereby allowing the user to select another day, as before.

PHONE GROUP SELECT (FIG. 14)

The phone directory is accessed for both input and output using the "phone" button, primarily. To optimize voice recognition, several alphabetical groups are assigned. Each name is input into one of the alphabetical groups and is retrieved from the same group. The groups are chosen for equal average utilization. For example, five groups of twenty names are alphabetically divided as follows: A–D, E–I, J–M, N–R and S–Z.

Figure 14:
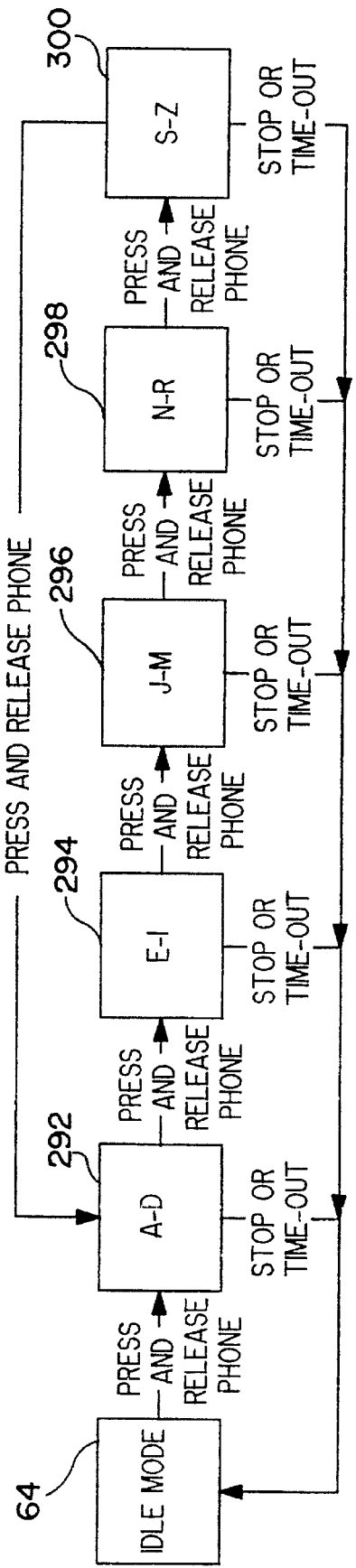
FIG. 14 is a flow diagram of the phone group select operation mode software routine implemented in the control program of the voice activated personal organizer of FIG. 1.

This is shown in the phone group select flow diagram of FIG. 14, which illustrates the manner in which the individual alphabetical groups are accessed. From the idle mode 64, the user presses the "phone" button multiple times to cycle through five different alphabetical groups of names 292, 294, 296, 298 and 300. For example, one press of the "phone" button accesses the A–D group 292. A further press of the button accesses the E–I group 294. Any time the "stop" button is pressed or a time-out occurs, the phone directory is exited.

PHONE NUMBER RETRIEVAL (FIG. 15)

Figure 15:
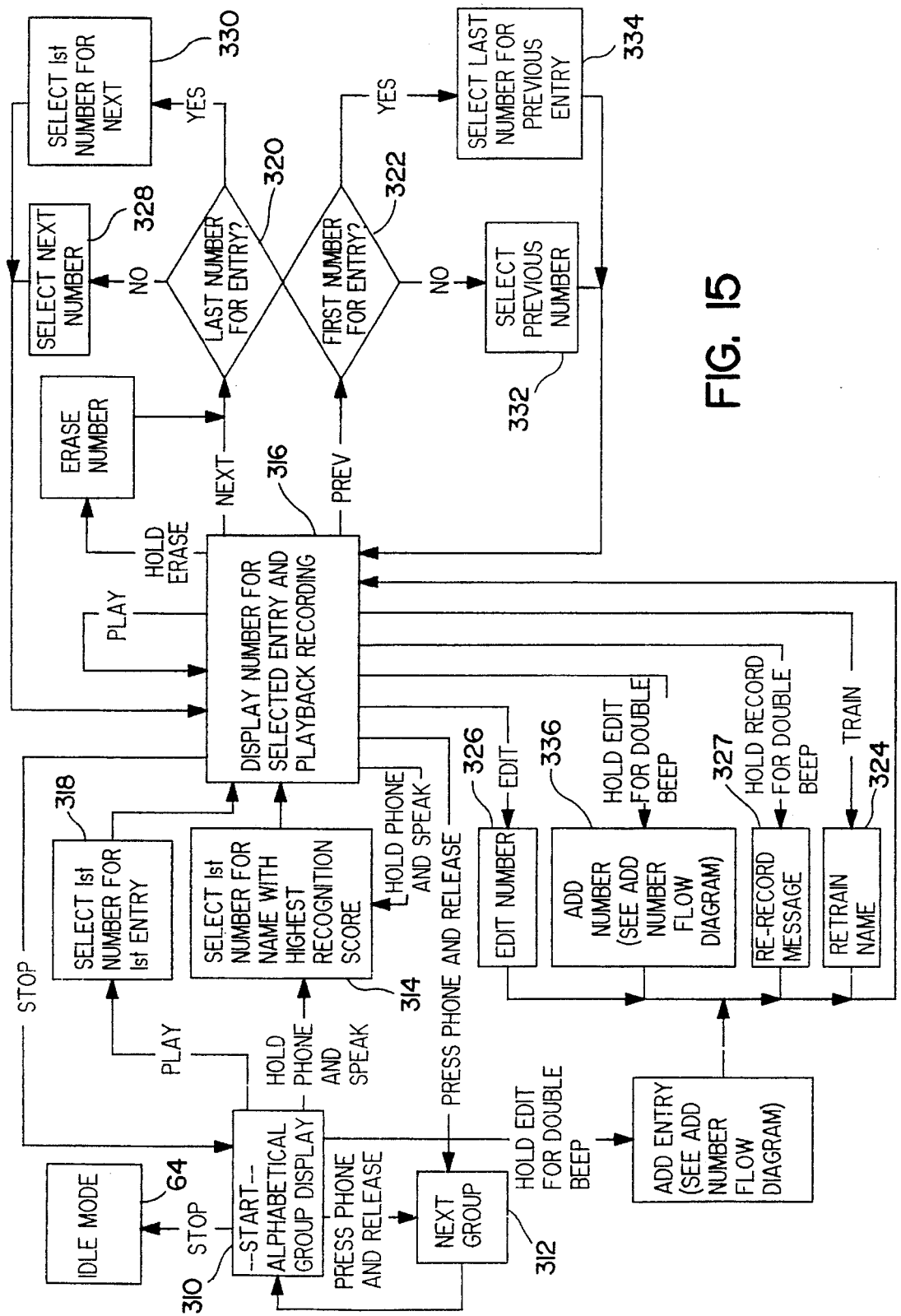
FIG. 15 is a flow diagram of the number retrieval operation mode software routine implemented in the control program of the voice activated personal organizer of FIG. 1.

FIG. 15 is a flow diagram for the phone number retrieval process, which accesses phone numbers already entered into the directory. From the idle mode 64, the alphabetical groups are displayed in a start step 310, and pressing of the "phone" button advances through the various alphabetical groups, as represented by a step 312 in FIG. 15. This takes place as previously described in connection with FIG. 14. The most common use of the phone directory involves holding the "phone" button down once the desired group is displayed, and speaking the name desired. This is represented by a step 314. When the name is recognized, the first number associated with the name is displayed. If the user wants another number associated with this name, the user presses the "next" key to get the next number, in steps 320 and 328. If there is no next number for the name, the next name in the directory is accessed, in a step 330. Every time a number is accessed, the recording associated with the directory entry is played back to confirm the name selected. The number is displayed at the same time, as represented by a step 318. Pressing the "play" button from the start step 310 selects the first number for the first entry, as represented by a step 318, for playback recording in the step 316.

From the step 316, the user can navigate manually through the directory using the "next" and "prev" buttons, as represented by steps 320 and 322. From the alphabetical group display, the user can access the directory without ever speaking a name by pressing the "play" button. This accesses the first number of the first name in the directory, as represented in the step 318. Any time a number is displayed, pressing the "play" button results in replay of the recording for that entry.

At the number display, represented by the step 316, the user may press the "stop" button to return to the alphabetical group display, via the start step 310, or press and release the "phone" button to go to the next group, as represented by the step 312.

The user may also perform editing features at the number display of the step 316. The user can retrain the templates for better recognition by pressing the "train" button to retrain the name in a step 324. This will initiate the same training sequence that was performed when the number was entered. The new templates replace the old templates, once the retraining is completed. If the user presses the "edit" button, as represented by a step 326, the first digit of the displayed phone number blinks and the user can change it using the "next" and "prev" buttons, as has been described for other manual entry. The user advances from digit to digit while editing, by pressing the "select" button. The recording for the selected entry can be replaced by holding the "record" button for a double beep and speaking the new utterance to be recorded, in a step 327.

Another number may be added to an entry by holding the "edit" button for a double beep as represented in a step 336 with a number associated with the desired entry being displayed. If the "edit" button is held for a double beep while an alphabetical group is displayed, then a new entry is made. If a new name is being added to the directory, the "edit" button is held at the alphabetical group display at the start step 310. If the group is full, an error message is displayed briefly and the group display is returned. If the group is not full, the screen prompts the user for the name. The user holds the "phone" button and speaks the name, repeating as prompted. Once the name is trained, the display prompts for the number. (If the "edit" button was held while a phone number is displayed and there are not four numbers already associated with this entry, then a new number is added starting at this point in the flow.) The user continues to hold the "phone" button and enters the phone number, one digit at a time.

When the user is finished entering the phone number, he or she presses the "save" button to indicate completion. This is necessary to allow for a variable length phone number (i.e., with area codes or without, and international numbers). The user then selects which of the four types of phone numbers is present; business, home, fax or other. Only those not already filled for this entry are presented to the user, who chooses using the "next" and "prev" buttons, and terminates by pressing the "save" button again.

The display then prompts the user to record a message. Typically, the message will simply be the name of the person, although a more detailed message may be recorded with other information. This recording is played back any time any of the numbers associated with this entry are played.

ADD PHONE NUMBER (FIG. 16)

Figure 16:
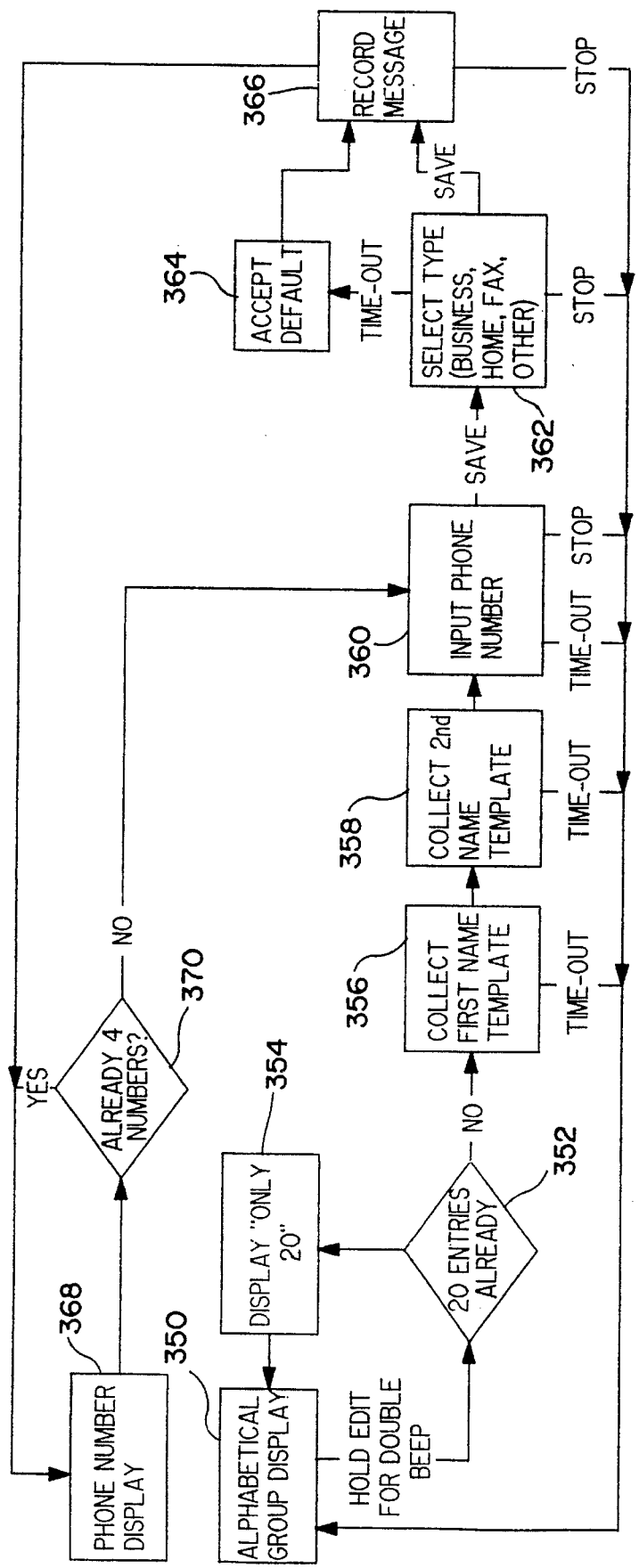
FIG. 16 is a flow diagram of the add phone number operation mode software routine implemented in the control program of the voice activated personal organizer of FIG. 1.
Figure 17:
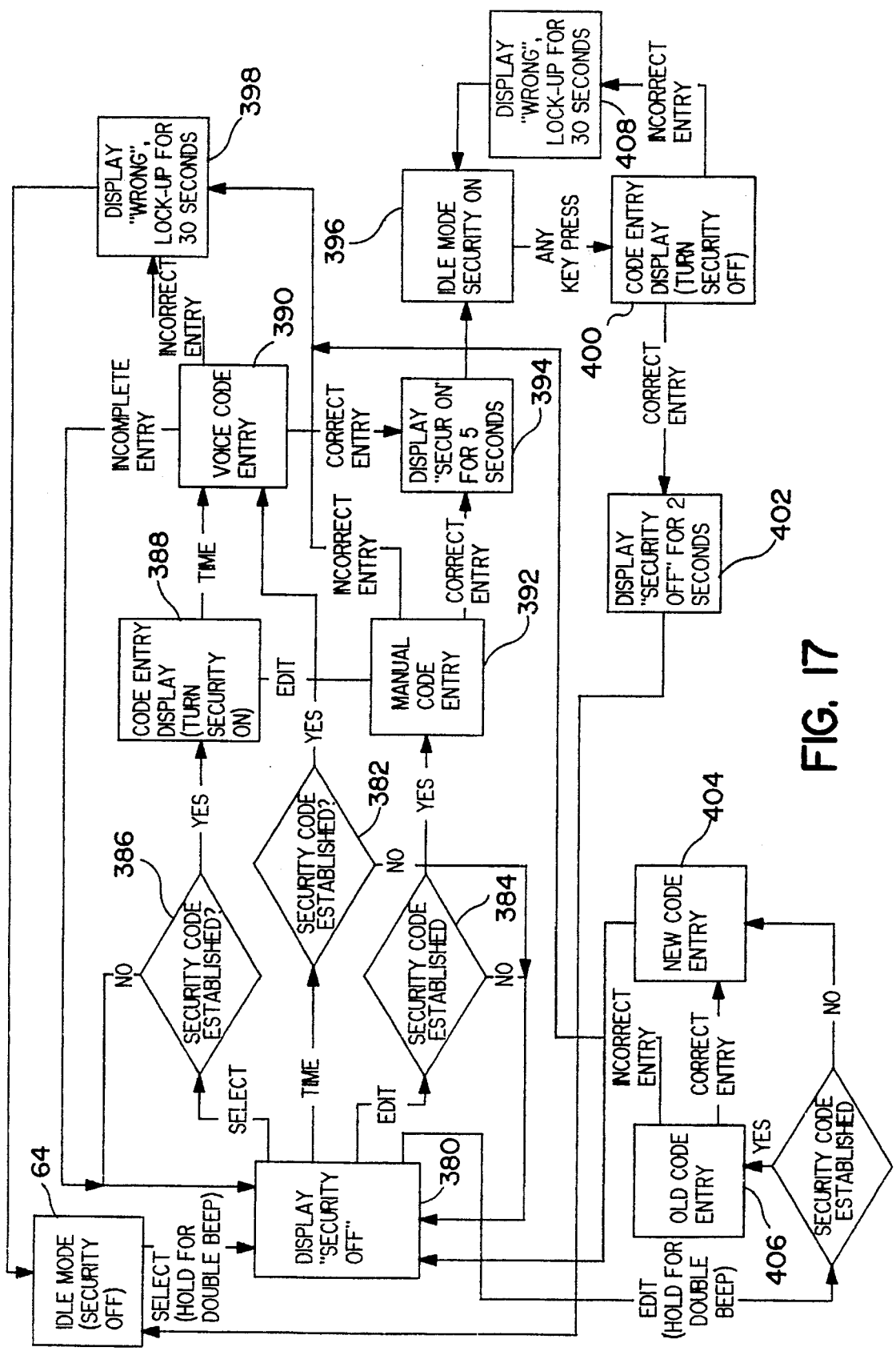
FIG. 17 is a flow diagram of the security operation mode software routine implemented in the control program of the voice activated personal organizer of FIG. 1.

The process of adding a phone number to the directory, as just described, is shown in the flow diagram of FIG. 16. The alphabetical group display of the start step 310 of FIG. 15 is represented by a step 350 in FIG. 16. Holding the "edit" button for a double beep reaches a step 352 to determine if there are already twenty entries in the directory. If so, then the step 350 is returned to via a step 354. If not, then first and second name templates are collected in steps 356 and 358, and the phone number is input in a step 360. The template collection process is the same as that used for training, as previously described, except that the "phone" button is held for input and repeat of the second collection as necessary. A time-out during the steps 356, 358 and 360 or pushing of the "stop" button during the step 360 causes return to the alphabetical group display step 350.

From the step 360, pushing the "save" button advances to a step 362 to select the type of phone number such as business, home, fax or other. From the step 362, a time-out results in an accept default step 364. After release of the "phone" button, the time-out period for template collection is 0.5 seconds. All other time-outs result after 30 seconds of inactivity.

From the step 362 or the step 364, recording is performed in a step 366. Recordings are done by holding the "phone" button or the "record" button. Again, pressing the "stop" button at either of the steps 362 and 366 returns to the alphabetical group display step 350. Once recording in step 366 is completed, the phone number is displayed, as represented by a step 368.

If the process is started by holding the "edit" button from a phone number display rather than an alphabetical group display, then the template collection is bypassed and a new number is added to the entry already selected. A step 370 determines whether or not there are four numbers already associated with an entry. If there are not four numbers already associated with the entry, then the new number is added starting at this point in the flow, via the step 360.

SECURITY (FIG. 17)

The security mode allows the user to lock-out all operations of the organizer 10 until a secret 4-digit code is entered. The security mode is accessed from the clock display of the idle mode 64 by holding the "select" button for a double beep. The first time that this is done by the user, the only activity permitted is establishment of a security code. Any other activity returns to a "SECURITY OFF" display in a step 380. To establish a code, the user holds the "edit" button for a double beep and then enters a 4-digit code in a step 404. Entry by voice is done by holding the "time" button and speaking four digits, each in the 0–9 range. Entry is done manually by pressing the "edit" button and then using the "next", "prev" and "select" buttons as for other manual functions. Once entry is complete, the "SECURITY OFF" display is returned, at the step 380.

With the code established, the user can move from the "SECURITY OFF" display, in step 380, to a code entry display for activating security. This is done by pressing the "select" button, in a step 386. With a security code having been established, the code entry is displayed, to turn security on, in a step 388. The user then holds the "time" button and speaks the four digits of the code in a step 390. Alternatively, the user can press the "edit" button and proceed with manual entry, in a step 392, as in the case of the step 384.

If the code entry is correct, the display momentarily shows the "SECUR ON" and then returns to the idle mode, but with security activated, in steps 394 and 396. If the entry is incorrect, the display shows "WRONG" and the unit is locked-up for 30 seconds, in a step 398.

Once security is activated, any keypress will go directly to the code entry display for entry of the code to deactivate security, as represented by a step 400. The user enters the code as previously described. If the entry is correct, the display shows "SECURITY OFF" and then returns to the idle mode, via a step 402.

When security is off, the user can change the security code by holding the "edit" for a double beep from the "SECURITY OFF" display 380. The user is asked to enter the old code. If the entry is correct, then the user is asked to enter a new code, via a step 404. New code entry can be performed by voice or Manually, as with other code entries. Any time the user enters an incorrect code, the system locks up for 30 seconds while displaying "WRONG" and then returns to the idle mode 64, as represented in steps 408 and 398.

"NO" LOGIC (FIG. 18)

Any time a voice recognition feature is used, the user has a means to correct for a misrecognized word. When the display shows a number or word that was not the word the user spoke, the user may subsequently say "no" while still holding the "time" (or "phone") button. This is shown in the "no" logic flow diagram of FIG. 18. At this point, the organizer 10 displays the word or number that scored second highest during the recognition process. If this is still not correct, the user may say "no" again. This time, the organizer 10 back-spaces over the entry and encourages the user to repeat the word. If the word is still misrecognized, the user may continue saying "no" and this process will iterate, with the second best guess being followed by repeating the word. Once the user is satisfied that the number or word displayed is correct, the user continues on with the next word or number desired.

Figure 18:
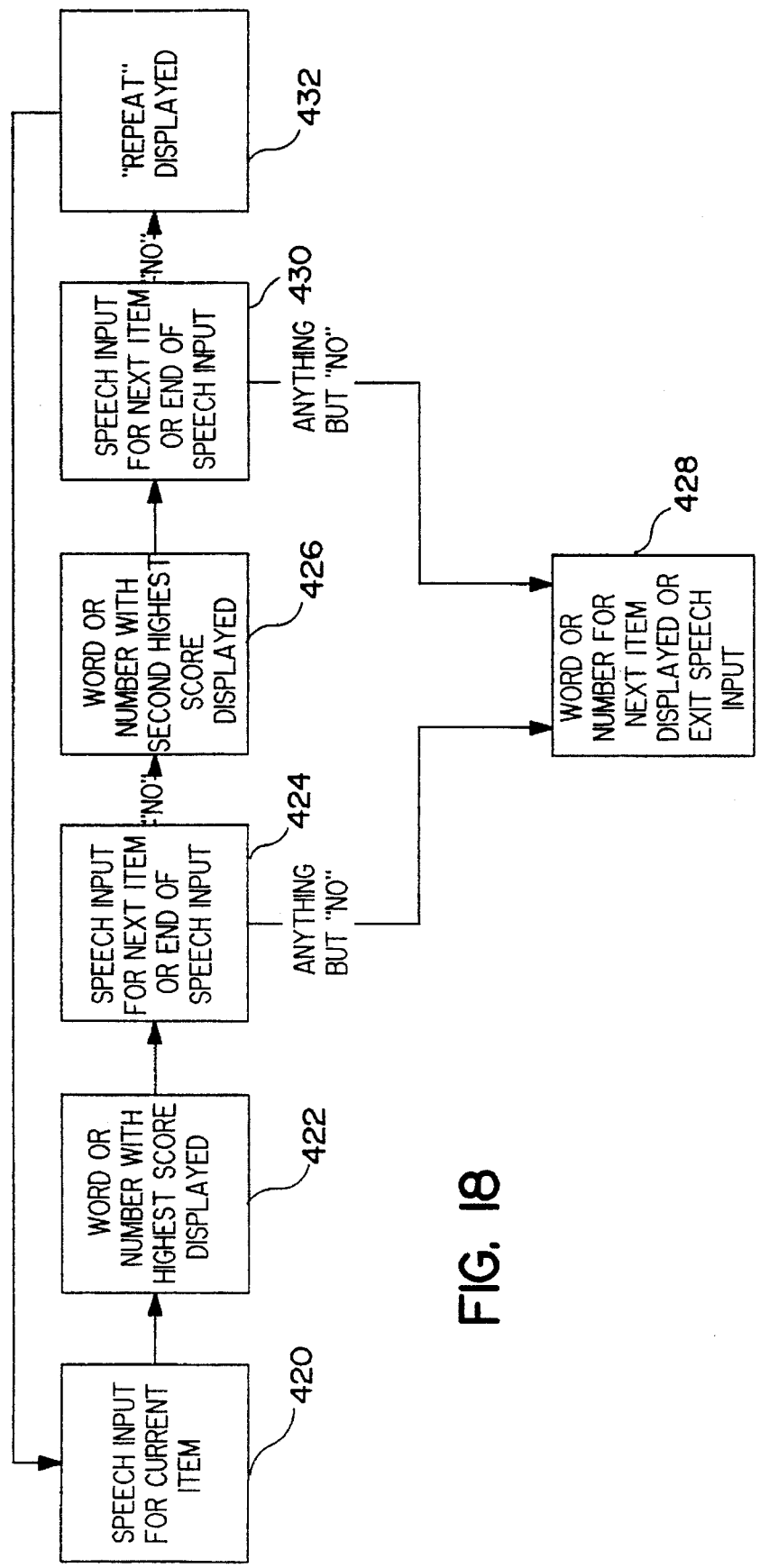
FIG. 18 is a flow diagram of the "No" logic operation mode software routine implemented in the control program of the voice activated personal organizer of FIG. 1.

This is shown in the flow diagram of FIG. 18 with a speech input at a step 420. This results in displaying of the word or number with the highest score, in a step 422. This is followed by speech input for the next item or the end of speech input, in a next step 424. If the user enters "no" then the word or number with the second highest score is displayed, in a step 426. Otherwise, the word or number for the next item is displayed, or speech input is exited in a step 428.

Following display of the word or number with the second highest score, in the step 426, speech input for the next item is entered or is ended, in a step 430. At this point, if the user speaks "no", then "REPEAT" is displayed, in a step 432, and the system returns to the step 420. Otherwise, the step 428 is advanced to.

The utilization of voice recording and voice recognition technology, in voice-activated personal organizers 10 in accordance with the invention, allows the size of the organizer 10 to be much smaller than manually-operated devices. The particular implementation of the organizer 10 shown in FIG. 2 is somewhat oval in shape so as to comfortably fit into the palm of the user's hand in such a way that the organizer 10 can be operated with one hand. The "record" and "time" buttons are on the corners immediately accessible by the user's thumb and forefinger. The "phone" and "select" buttons are on the top, between such buttons. These four buttons are the most-used buttons.

The "play", "next", "play" and "stop" buttons are on the face of the organizer 10, below the LCD display 20, and in a diamond-shaped arrangement. These buttons carry the universal symbols used in tape players and similar devices. The four least used buttons are the "train", "save", "erase" and "edit" buttons These buttons appear below the "play", "next", "play", and "stop" buttons.

The microphone 24 and the speaker 32 are located behind the buttons on the face of the organizer 10, and face in the same direction as in the LCD display 20. This ensures proper alignment when the user places the unit for easy viewing of the display 20.

It will be appreciated by those skilled in the art that variations and alternatives are possible in accordance with the invention. For example, the organizer 10 can be embodied in a form more closely related to that of a standard organizer with a small keypad for entering some text that is beyond current voice recognition technology, such as addresses. In such instances, the use of voice recognition technology for most input would make it feasible to use a smaller keyboard (and thus a smaller physical unit), without making the organizer difficult for the user. Such an organizer can have a larger display, thereby allowing for more complex messages of the type used in larger organizers. Such complex images can include, for example, a full week calendar showing appointments "blocked out" or names with addresses and phone numbers. This variation provides the user with the benefits of a more natural interface using voice for recordings and recognition, together with the ability to input more complex information using a keyboard when necessary.

Still other variations of the organizer 10 in accordance with the invention can be implemented in a physical form similar to that shown in FIG. 2, but with some of the software features being changed. For example, an expense logging and reporting feature can be added with no change to the physical or electrical implementation. In such a case, the user can access the expense feature in the same way as the calendar described herein. The user either presses the "select" button several times to access expenses manually, or presses the "time" button (probably renamed "voice" for this application) and says the word "expenses." After entering the expenses category, the user can speak the name of a category such as "air fare", "car rental", "entertainment", "hotel", "meals", "mileage", "phone", or the like. To add an expense item, the user continues to hold the "voice" button and speaks a dollar value, one digit at a time, such as "two ... one ... point ... seven ... five" for $21.75. Once the entry is completed, the user can record a comment to be attached to such entry, in the same way that a recording is attached to a phone directory entry. When the item is saved, it is tagged with the current time and date. For retrieval of information, the user holds the "voice" button and says the word "expenses" followed by the name of a category. Instead of continuing to speak, the user releases the "voice" button. The organizer then shows the total number of items recorded for this category. At this point, the organizer functions in much the same way as in the case of the calendar feature described above. The user presses the "play" button to start review of the entries, one by one, for this category in chronological order, moving from entry to entry using the "next" and "prev" buttons. At the end of all entries is the total for such entries, so that the user does not have to add up all the entries by himself or herself.

When finished with the entries in a category, the user presses the "stop" button to return to the category display, and then uses the "next" and "prev" buttons to move to another category or "stop" (again), to exit. In this way, the user can easily review all entries in each category for filling out an expense report, and the like. A special "category" is available by voice or manually. For example, for a total, the user either speaks the word "total" or manually advances through all the standard categories to arrive at the total which will display the grand total of all entries in the expense categories.

Another special "category" is "date". If the user says the word "date" instead of a category, the review is by date, much in the manner of the calendar feature described above, rather than by category as also previously described. Other than this difference, the user interface is the same.

Still other features and variations are possible in accordance with the invention. The common features of voice recognition and voice recording technologies provide for a more comfortable and familiar interface for the user. Such common features also allow for the implementations to be more comfortable in size, particularly in terms of making such implementations smaller. Such improvements over present technology allow for such personal information devices to be more personal and easy to use and, therefore, to better serve the primary purpose of this type of device. Consequently, such devices comprise easily carried and easily used means of storing and retrieving commonly needed information.

While the invention has been particularly shown and described with reference to preferred embodiments thereof, it will be understood by those skilled in the art that various changes in form and details may be made therein without departing from the spirit and scope of the invention.

What is claimed is:

1. An electronic organizer comprising:
   a first transducer for converting acoustic sound energy representing spoken words into an electrical speech signal;
   a coupling circuit having an input for receiving the electrical speech signals and first and second outputs each for providing a respective output signal corresponding to the electrical speech signal;
   recording means coupled to said first output for recording an output signal in a form to permit reproduction of the corresponding electrical speech signals;
   word identifying means coupled to said second output for identifying a spoken word from among a selected plurality of spoken words;
   data storage means coupled to said word identifying means for storing data corresponding to each identified spoken word;
   function selection means including a plurality of manually operable function selection members; and
   control means coupled to said recording means, said word identifying means, said data storage means and said function selecting means for causing an output signal at said first output to be recorded by said recording means in response to manual operation of a first one of said function selection members, and for causing said word identifying means to identify, and said data storage means to store data corresponding to, at least one spoken word which is spoken following manual operation of a second one of said function selection members, said control means being responsive to sequential operations of the first and second ones of said function selection members for associating an output signal recorded by said recording means in response to the operation of the first one of said function selection members with the stored data corresponding to the at least one word spoken following the operation of the second one of said function selection members, wherein said coupling circuit is operative for subjecting the received electrical speech signals to a first processing that modifies the received electrical speech signals for speech recording and supplying signals which have undergone the first processing to said first output, and for subjecting received electrical speech signals to a second processing, different from the first processing, that modifies the received electrical speech signals for identification by said word identifying means and supplying signals which have undergone the second processing to the second output.

2. An electronic organizer in accordance with claim 1 wherein there are a plurality of types of data each associated with a group of selected spoken words that can be identified by said word identifying means, said function selection means are operable for selecting at least one of the types of data, said organizer further comprises a visual display having a plurality of display regions each associated with a respective one of the types of data, and said control means are coupled to said visual display for causing a readable representation of a spoken word identified by said word identifying means to be displayed in a display region associated with one of the types of data in response to operation of said function selection means to select the at least one of the types of data.

3. An electronic organizer in accordance with claim 1 wherein said control means are operative, in response to selection of one of the types of data by said function selection means, for causing said visual display to produce a distinctive visual indication in the display region associated with the selected one of the types of data, which visual indication informs a user of the type of data for which a word is to be spoken.

4. An electronic organizer in accordance with claim 2 when said control means are operative in response to operation of said second one of said function selection members for causing said visual display to produce a distinctive visual indication in a first one of the display regions until said word identifying means has identified a spoken word associated with the same type of data as said first one of said display regions, and for causing said visual display to produce a distinctive visual indication in a second one of the display regions in response to identification by said word identifying means has identified a spoken word associated with the same type of data as said first one of said display regions.

5. An electronic organizer in accordance with claim 1 further comprising a second transducer for converting signals recorded in said recording means into audible speech signals and a visual display for producing readable representations of data stored in said data storage means, and wherein said control means are coupled to said second transducer and to said visual display for outputting signals recorded in said recording means only to said second transducer and for outputting signals based on data stored in said data storage means only to said visual display.

6. An electronic organizer in accordance with claim 1 further comprising a casing containing said transducer, said coupling circuit and all of said means and shaped and dimensioned to be held in a user's hand.

* * * * *